US011982975B2

(12) United States Patent
Tsurumi et al.

(10) Patent No.: US 11,982,975 B2
(45) Date of Patent: May 14, 2024

(54) ELECTROSTATIC CHARGE IMAGE DEVELOPING CARRIER, ELECTROSTATIC CHARGE IMAGE DEVELOPER, PROCESS CARTRIDGE, IMAGE FORMING APPARATUS AND IMAGE FORMING METHOD

(71) Applicant: FUJIFILM Business Innovation Corp., Tokyo (JP)

(72) Inventors: Yosuke Tsurumi, Minamiashigara (JP); Yasuo Kadokura, Minamiashigara (JP); Takuro Watanabe, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 412 days.

(21) Appl. No.: 17/374,784

(22) Filed: Jul. 13, 2021

(65) Prior Publication Data

US 2022/0299905 A1 Sep. 22, 2022

(30) Foreign Application Priority Data

Mar. 17, 2021 (JP) ................................ 2021-043920

(51) Int. Cl.
*G03G 9/113* (2006.01)
*G03G 9/107* (2006.01)
*G03G 21/18* (2006.01)

(52) U.S. Cl.
CPC ......... *G03G 9/1139* (2013.01); *G03G 9/1075* (2013.01); *G03G 9/1133* (2013.01); *G03G 21/1814* (2013.01)

(58) Field of Classification Search
None
See application file for complete search history.

(56) References Cited

U.S. PATENT DOCUMENTS

| | | | | |
|---|---|---|---|---|
| 2012/0064452 A1* | 3/2012 | Tsurumi | ............... | G03G 9/1133 430/111.32 |
| 2013/0065171 A1* | 3/2013 | Yaguchi | ............... | G03G 9/1136 430/111.3 |
| 2014/0072910 A1 | 3/2014 | Iwatsuki et al. | | |
| 2016/0282753 A1 | 9/2016 | Kakehi et al. | | |

(Continued)

FOREIGN PATENT DOCUMENTS

| | | |
|---|---|---|
| JP | 2007-333886 A | 12/2007 |
| JP | 2009-86340 A | 4/2009 |
| JP | 2013-57817 A | 3/2013 |

OTHER PUBLICATIONS

Communication dated Dec. 23, 2021 by the European Patent Office in European Patent Application No. 21189883.8.

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

An electrostatic charge image developing carrier contains a magnetic particle and a resin coating layer coating the magnetic particle, in which the resin coating layer contains inorganic particles, a ratio B/A of a surface area B of the carrier to a plan view area A of the carrier that are obtained by three-dimensional analysis of a surface of the carrier is 1.020 or more and 1.100 or less, a volume average particle diameter of the magnetic particle is 25 μm or more and 34 μm or less, and a fluidity of the magnetic particle is 28 s/50 g or more and 36 s/50 g or less.

18 Claims, 2 Drawing Sheets

(56) References Cited

U.S. PATENT DOCUMENTS

| | | | |
|---|---|---|---|
| 2017/0242354 | A1 | 8/2017 | Saito et al. |
| 2017/0255120 | A1 | 9/2017 | Hasegawa et al. |
| 2018/0275543 | A1 | 9/2018 | Yoshihara et al. |

* cited by examiner

ELECTROSTATIC CHARGE IMAGE DEVELOPING CARRIER, ELECTROSTATIC CHARGE IMAGE DEVELOPER, PROCESS CARTRIDGE, IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2021-043920 filed on Mar. 17, 2021.

BACKGROUND

1. Technical Field

The present invention relates to an electrostatic charge image developing carrier, an electrostatic charge image developer, a process cartridge, an image forming apparatus, and an image forming method.

2. Related Art

JP-A-2009-086340 discloses a carrier core material for an electrophotographic developer, in which when a specific surface area of the carrier core material measured by a BET method is defined as a BET specific surface area, and a specific surface area when the carrier core material is assumed to be a true sphere is defined as a true sphere equivalent specific surface area, a value of [BET specific surface area]/[true sphere equivalent specific surface area] is 8.0 or more and 30.0 or less, a value of a surface roughness Ra measured by reflected electron image analysis with a scanning electron microscope is 0.050 μm or less, and an apparent density is 2.40 g/cc or more.

JP-A-2013-057817 describes an electrostatic latent image developing carrier including magnetic core particles and a coating layer that coats the core particles, having a shape coefficient SF-2 of 115 to 150, and having a bulk density of 1.8 $g/cm^3$ to 2.4 $g/cm^3$, in which a shape coefficient SF-2 of the core particles is 120 to 160, an arithmetic average surface roughness Ra of the core particles is 0.5 μm to 1.0 μm, the coating layer contains a resin and a filler, and the filler is contained in a ratio of 50 parts by mass to 500 parts by mass with respect to 100 parts by mass of the resin.

SUMMARY

Aspects of non-limiting embodiments of the present disclosure relate to an electrostatic charge image developing carrier that is excellent in a density change inhibitory property even when high density printing is performed after continuous printing with a small amount of image as compared with a case where a ratio B/A of a surface area B to a plan view area A is less than 1.020 or more than 1.100 in which the surface area B and the plan view area A are obtained by three dimensionally analysis of the surface of the carrier, or an average particle diameter of magnetic particles is less than 25 μm or more than 34 μm, or a fluidity of the magnetic particles is less than 28 s/50 g or more than 36 s/50 g.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing carrier, containing:

- a magnetic particle; and
- a resin coating layer coating the magnetic particle, in which
- the resin coating layer contains inorganic particles,
- a ratio B/A of a surface area B of the carrier to a plan view area A of the carrier that are obtained by three-dimensional analysis of a surface of the carrier is 1.020 or more and 1.100 or less,
- a volume average particle diameter of the magnetic particle is 25 μm or more and 34 μm or less, and
- a fluidity of the magnetic particle is 28 s/50 g or more and 36 s/50 g or less.

BRIEF DESCRIPTION OF DRAWINGS

Exemplary embodiment(s) of the present invention will be described in detail based on the following figures, wherein.

DETAILED DESCRIPTION

Figure 1:
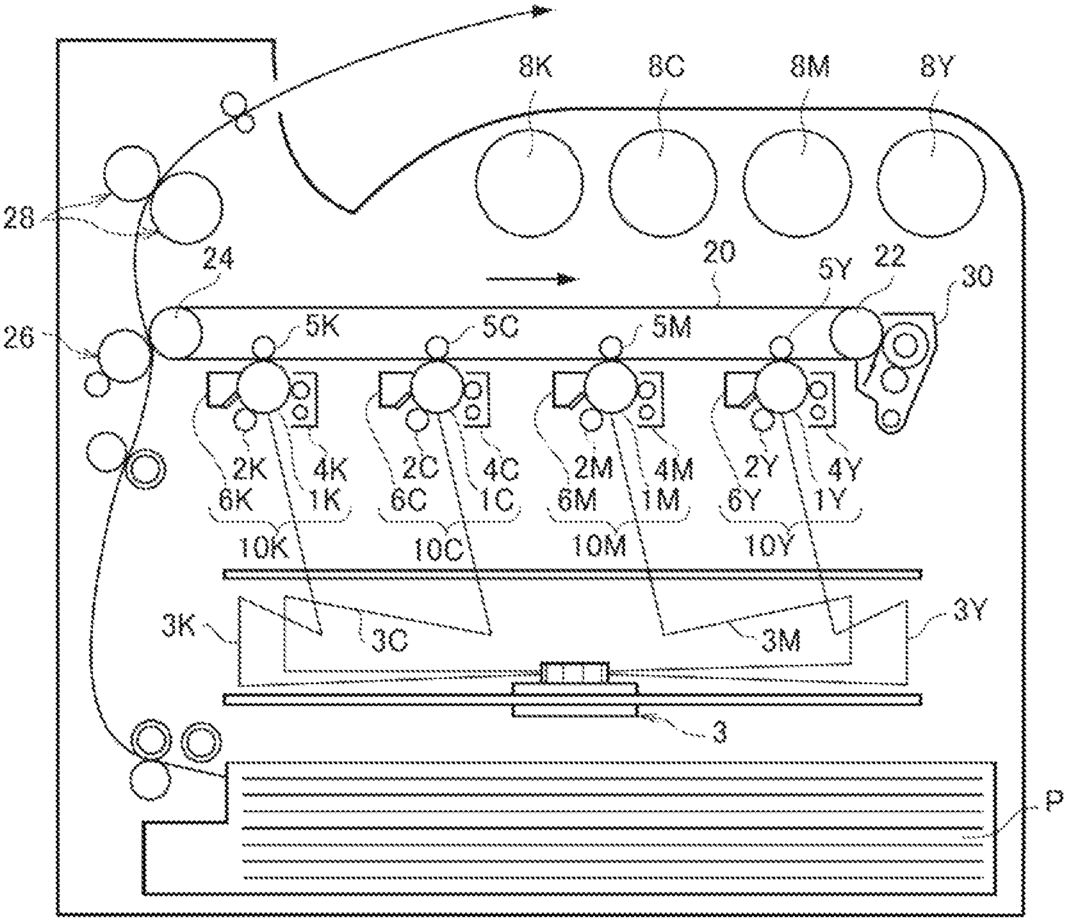
FIG. 1 is a schematic configuration diagram illustrating an example of an image forming apparatus according to the present exemplary embodiment.

Hereinafter, an exemplary embodiment of the present disclosure will be described. These descriptions and Examples illustrate the exemplary embodiment, and do not limit the scope of the exemplary embodiment.

In the present disclosure, a numerical range indicated by "to" indicates a range including numerical values before and after "to" as a minimum value and a maximum value, respectively.

In numerical ranges described in stages in the present disclosure, an upper limit or a lower limit described in one numerical range may be replaced with an upper limit or a lower limit of a numerical range described in other stages. In the numerical ranges described in the present disclosure, the upper limit or the lower limit of the numerical range may be replaced with values shown in Examples.

In the present disclosure, the term "step" indicates not only an independent step, and even when a step cannot be clearly distinguished from other steps, this step is included in the term "step" as long as an intended purpose of the step is achieved.

When an exemplary embodiment is described in the present disclosure with reference to the drawings, a configuration of the exemplary embodiment is not limited to a configuration illustrated in the drawings. Sizes of members in each drawing are conceptual, and a relative size relation between the members is not limited to this.

In the present disclosure, each component may include plural corresponding substances. In the present disclosure, in a case of referring to an amount of each component in a composition, when there are plural substances corresponding to each component in the composition, unless otherwise specified, it refers to a total amount of the plural substances present in the composition.

In the present disclosure, a plural kinds of particles corresponding to each component may be selected. In a case where there are plural kinds of particles corresponding to each component in the composition, unless otherwise specified, a particle diameter of each component means a value for a mixture of the plural kinds of particles present in the composition.

In the present disclosure, the term "(meth)acryl" means at least one of acryl and methacryl, and the term "(meth) acrylate" means at least one of acrylate and methacrylate.

In the present disclosure, the term "electrostatic charge image developing toner" is also referred to as "toner", the term "electrostatic charge image developing carrier" is also referred to as "carrier", and the term "electrostatic charge image developer" is also referred to as "developer".

(Electrostatic Charge Image Developing Carrier)

An electrostatic charge image developing carrier according to the present exemplary embodiment contains a magnetic particle and a resin coating layer that coats the magnetic particle, in which the resin coating layer contains inorganic particles, a ratio B/A of a surface area B to a plan view area A is 1.020 or more and 1.100 or less in which the surface area B and the plan view area A are obtained by three dimensionally analysis of the surface of the carrier, a volume average particle diameter of the magnetic particle is 25 μm or more and 34 μm or less, and a fluidity of the magnetic particle is 28 s/50 g or more and 36 s/50 g or less.

In the present exemplary embodiment, carbon black is not treated as inorganic particles.

The carrier according to the present exemplary embodiment is excellent in a density change inhibitory property even when high density printing is performed after continuous printing with a small amount of images (simply also referred to as "density change inhibitory property"). A mechanism thereof is presumed as follows.

In a case of continuously performing print having a small amount of images such as a document with mainly black characters and a small amount of colored characters, since a consumption amount of the toner is small and the toner stays in a developing device for a long time, the toner, especially the color toner tends to be charged more than necessary The present inventors have found that in a case where high-density printing is performed after printing continuously the document having the small amount of images as described above, it becomes difficult to develop due to high charging, and a desired image density may not be printed sufficiently.

It is presumed that in a case where the toner stays in the developing device for a long time, since charge exchange continues between the toner and the carrier, and a state of the external additive of the toner changes (i.e., the external additive desorbs from the toner, the external additives is buried in the toner surface and so on), the charging state is changed.

It is presumed that when the electrostatic charge image developing carrier according to the present exemplary embodiment is used, an external additive desorbed from the toner is not fixed to a carrier surface, and adhesion amounts of the external additive between a toner surface and the carrier surface become balanced (the external additive moves between the toner and the carrier, and if the amounts thereof become constant, the adhesion amounts become balanced), so that it is presumed that it becomes difficult for changes over time to occur. In a case where the average particle diameter and the fluidity of the magnetic particle are within the ranges of the present exemplary embodiment, ruggedness on a surface of the magnetic particle is not sharp and smooth, and a difference in ruggedness between a surface of the resin coating layer and a surface of the magnetic particle exposed at the carrier surface becomes small. Therefore, it is considered that the balanced state moves to a direction in which the external additive does not separate from the toner. It is presumed that this is because a force applied to the toner is weakened and at the same time, the external additive is less likely to be trapped at the carrier surface. It is possible to obtain an effect by combining both, and even when high-density printing is performed after continuously performing print having a small amount of image, it is possible to provide an image with little change in density.

Hereinafter, a configuration of the carrier according to the present exemplary embodiment will be described in detail.

<Ratio B/A of Surface Area B to Plan View Area A which are Obtained by Three-Dimensional Analysis of a Surface of the Carrier>

The carrier according to the present exemplary embodiment has a ratio B/A of the surface area B to the plan view area A of 1.020 or more and 1.100 or less, and from the viewpoint of the density change inhibitory property, the ratio B/A is preferably 1.040 or more and 1.080 or less, and more preferably 1.040 or more and 1.070 or less. The surface area B and the plan view area A are obtained by three dimensionally analysis of the surface of the carrier.

In the present exemplary embodiment, the ratio B/A is an index for evaluating a surface roughness. The ratio B/A is, for example, obtained by the following method.

As a device for three-dimensionally analyzing the carrier surface, a scanning electron microscope including four secondary electron detectors (for example, electron beam three-dimensional roughness analyzer ERA-8900FE, manufactured by Elionix Inc.) is used, and analysis is performed as follows.

The surface of one carrier particle is enlarged 5,000 times. A distance between two measurement points is set to 0.06 μm, and the measurement point is set to 400 points in a long side direction and 300 points in a short side direction, and a region of 24 μm×18 μm is measured to obtain three-dimensional image data.

For the three-dimensional image data, a limit wavelength of a spline filter (a frequency selection filter using a spline function) is set to 12 μm to remove wavelengths having a period of 12 μm or more, so that a waviness component of the carrier surface is removed and a roughness component is extracted to obtain a roughness curve.

Furthermore, a cutoff value of a Gaussian high-pass filter (a frequency selection filter using the Gaussian function) is set to 2.0 μm to remove wavelengths having a period of 2.0 μm or more, so that wavelengths corresponding to convex portions of the magnetic particle exposed at the carrier surface are removed from the roughness curve after the spline filtering to obtain a roughness curve from which a wavelength component having a period of 2.0 μm or more is removed.

From three-dimensional roughness curve data after the filtering, the surface area B ($\mu m^2$) of a region of a central portion 12 μm×12 μm, (the plan view area A=144 $\mu m^2$) is obtained, so as to obtain the ratio B/A. The ratio B/A is calculated for each of 100 carriers and an arithmetic average is performed.

<Magnetic Particle>

The electrostatic charge image developing carrier according to the present exemplary embodiment contains magnetic particle and a resin coating layer that coats the magnetic particle, in which the volume average particle diameter of the magnetic particle is 25 μm or more and 34 μm or less, and the fluidity of the magnetic particle is 28 s/50 g or more and 36 s/50 g or less.

The volume average particle diameter of the magnetic particle is 25 μm or more and 34 μm or less. If the volume average particle diameter is less than 25 μm, since the surface area of the carrier becomes too large, the balance of the movement of the external additive is too close to the carrier side, and the density change inhibitory property is inferior. If the volume average particle diameter exceeds 34 μm, since the particle diameter is large, stress of the toner becomes too large, and the density change inhibitory property is inferior.

The volume average particle diameter of the magnetic particle is preferably 26 μm or more and 33 μm or less, and more preferably 28 μm or more and 32 μm or less from the viewpoint of the density change inhibitory property.

The volume average particle diameters of the magnetic particle and the carrier in the present exemplary embodiment are values measured by a laser diffraction particle size distribution measuring device LA-700 (manufactured by HORIBA, Ltd.). Specifically, the volume average particle diameter is defined as a particle diameter corresponding to a cumulative percentage of 50% in a cumulative distribution by volume drawn from a small diameter side with respect to a divided particle size range (channel) of the particle size distribution obtained by the measuring device.

A preferred method for separating the magnetic particle from the carrier is to dissolve the resin coating layer with an organic solvent to separate the magnetic particle. A preferred method for measuring a BET specific surface area will be described later.

The fluidity of the magnetic particle is 28 s/50 g or more and 36 s/50 g or less. When the fluidity is less than 28 s/50 g, the surface is smooth, embedding of the external additive into the toner is easily promoted, and the density change inhibitory property is inferior. When the fluidity is greater than 36 s/50 g, the surface ruggedness is sharp, removal of the external additive from the toner is promoted, the external additive is easy to fix to a gap between the magnetic particle and the coating layer, and the density change inhibitory property is inferior.

From the viewpoint of the density change inhibitory property, the fluidity of the magnetic particle is preferably 29 s/50 g or more and 35 s/50 g or less, more preferably 30 s/50 g or more and 34 s/50 g or less, and particularly preferably 31 s/50 g or more and 33 s/50 g or less.

The fluidity of the magnetic particle in the present exemplary embodiment is a value measured according to JIS Z2502 (2020) under 25° C. and 50% RH.

As a material of the magnetic particle, a known material used as a core material of the carrier is applied.

Specific examples of the magnetic particle include: a particle of a magnetic metal such as iron, nickel, and cobalt; a particle of a magnetic oxide such as ferrite and magnetite; a resin-impregnated magnetic particle obtained by impregnating a porous magnetic powder with a resin; and a magnetic powder-dispersed resin particle in which a magnetic powder is dispersed and blended in a resin. A ferrite particle is preferred as the magnetic particle in the present exemplary embodiment.

The magnetic particle preferably contains calcium element, is more preferably a ferrite particle containing calcium element, and particularly preferably a ferrite particle containing iron element, manganese element, magnesium element and calcium element from the viewpoints of chargeability, chargeability at a high temperature and high humidity environment, and the density change inhibitory property.

When the magnetic particle contains calcium element, a dielectric constant increases, a decrease in charging at a high temperature and high humidity environment can be prevented, and the density change inhibitory property is also excellent.

A content of the calcium element in the magnetic particle is preferably 0.1 mass % or more and less than 2.0 mass %, more preferably 0.2 mass % or more and less than 1.5 mass %, and particularly preferably 0.5 mass % or more and less than 1.0 mass % from the viewpoints of image quality stability at a high temperature and high humidity environment and the density change inhibitory property.

The content of the calcium element contained in the magnetic particle is measured by fluorescent X-ray analysis. The fluorescent X-ray analysis for the ferrite particle is performed by the following method.

Qualitative and quantitative analysis is performed using a fluorescent X-ray analyzer (XRF1500, manufactured by Shimadzu Corporation) under conditions of X-ray output: 40 V/70 mA, measurement area: 10 mm in diameter, and measurement time: 15 minutes. Elements to be analyzed are selected based on elements detected by the qualitative analysis. Mainly, iron (Fe), manganese (Mn), magnesium (Mg), calcium (Ca), strontium (Sr), oxygen (O), and carbon (C) are selected. A mass ratio (%) of each element is calculated with reference to calibration curve data prepared separately.

From the viewpoints of long-term image quality stability and the density change inhibitory property, a value of the BET specific surface area of the magnetic particle is preferably 0.10 $m^2/g$ or more and 0.35 $m^2/g$ or less, more preferably 0.14 $m^2/g$ or more and 0.28 $m^2/g$ or less, and particularly preferably 0.16 $m^2/g$ or more and 0.24 $m^2/g$. Within the above range, an appropriate amount of coating resin enters gaps between the magnetic particles, deterioration of the resin coating layer due to an anchoring effect can be prevented, and the long-term image quality stability and the density change inhibitory property are excellent.

The BET specific surface area of the magnetic particle is measured by a three point method of nitrogen adsorption using an SA3100 specific surface area measuring device (manufactured by Beckman Coulter, Inc.). Specifically, the BET specific surface area of the magnetic particle is measured by putting 5 g of magnetic particles in a cell, performing a degassing treatment at 60° C. for 120 minutes, and using a mixed gas of nitrogen and helium (30:70).

More specifically, as a method for separating the magnetic particles from the carrier, for example, 20 g of a resin-coated carrier is put in 100 mL of toluene. Ultrasonic waves are applied for 30 seconds under a condition of 40 kHz. The magnetic particles are separated from a resin solution using any filter paper according to the particle diameter. 20 mL of toluene is poured over the magnetic particles remaining on the filter paper to wash the magnetic particles. Next, the magnetic particles remaining on the filter paper are recovered. Similarly, the recovered magnetic particles are put in 100 mL of toluene and ultrasonic waves are applied for 30 seconds under a condition of 40 kHz. Similarly, the magnetic particles are filtered, washed with 20 mL of toluene, and then recovered. The above process is performed for a total of 10 times. The finally recovered magnetic particles are dried, and the BET specific surface area is measured under the above conditions.

An arithmetic average height Ra (JIS B0601: 2001) of the roughness curve of the magnetic particle is obtained by observing the magnetic particle at an appropriate magnification (for example, a magnification of 1000 times) using a surface shape measuring device (for example, "Ultra Depth Color 3D shape measurement microscope VK-9700" manufactured by KEYENCE CORPORATION), obtaining a roughness curve at a cutoff value of 0.08 mm, and extracting a reference length of 10 μm from the roughness curve in a direction of an average line thereof. The arithmetic average value of Ra of 100 magnetic particles is preferably 0.1 μm or more and 1 μm or less, and more preferably 0.2 μm or more and 0.8 μm or less.

As for a magnetic force of the magnetic particle, saturation magnetization in a magnetic field of 3,000 Oersted is preferably 50 emu/g or more, and more preferably 60 emu/g or more. The saturation magnetization is measured using a vibration sample type magnetic measuring device VSMP10-15 (manufactured by Toei Industry Co., Ltd.). A measurement sample is packed in a cell having an inner diameter of 7 mm and a height of 5 mm and set in the device. The measurement is performed by applying an applied magnetic field and sweeping up to 3,000 Oersted. Next, the applied magnetic field is reduced to create a hysteresis curve on recording paper. Saturation magnetization, residual magnetization, and a holding force are obtained from data of the curve.

A volume electric resistance (volume resistivity) of the magnetic particle is preferably $1\times10^5$ Ω·cm or more and $1\times10^9$ Ω·cm or less, and more preferably $1\times10^7$ Ω·cm or more and $1\times10^9$ Ω·cm or less.

The volume electric resistance (Ω·cm) of the magnetic particle is measured as follows. A layer is formed by flatly placing an object to be measured on a surface of a circular jig on which a 20 $cm^2$ electrode plate is arranged so as to have a thickness of 1 mm or more and 3 mm or less. Another 20 $cm^2$ electrode plate is placed thereon to sandwich the layer. In order to eliminate voids between the object to be measured, the thickness (cm) of the layer is measured after applying a load of 4 kg on the electrode plate arranged on the layer. Both electrodes above and below the layer are connected to an electrometer and a high voltage power generator. A high voltage is applied to both electrodes so that an electric field is 103.8 V/cm, and a current value (A) flowing at this time is read. A measurement environment is under a temperature of 20° C. and a relative humidity of 50%. An equation for calculating the volume electric resistance (Ω·cm) of the object to be measured is as shown in the equation below.

$$R=E\times20/(I-I_0)/L$$

In the above equation, R represents the volume electric resistance (Ω·cm) of the object to be measured, E represents the applied voltage (V), I represents the current value (A), $I_0$ represents a current value (A) under an applied voltage of 0 V, and L represents the thickness (cm) of the layer. The coefficient 20 represents the area ($cm^2$) of the electrode plate.

<Resin Coating Layer>

The electrostatic charge image developing carrier according to the present exemplary embodiment includes the resin coating layer that coats the magnetic particle, and the resin coating layer contains inorganic particles.

From the viewpoint of the density change inhibitory property, an average thickness of the resin coating layer in the present exemplary embodiment is preferably 0.6 μm or more and 1.4 μm or less, more preferably 0.8 μm or more and 1.2 μm or less, and particularly preferably 0.8 μm or more and 1.1 μm or less.

Examples of the inorganic particles contained in the resin coating layer include metal oxide particles such as silica, titanium oxide, zinc oxide, and tin oxide, metal compound particles such as barium sulfate, aluminum borate, and potassium titanate, and metal particles such as gold, silver, and copper.

Among these, silica particles are preferred from the viewpoint of the density change inhibitory property.

From the viewpoint of the density change inhibitory property, an arithmetic average particle diameter of the inorganic particles in the resin coating layer is preferably 5 nm or more and 90 nm or less, more preferably 5 nm or more and 70 nm or less, still more preferably 5 nm or more and 50 nm or less, and particularly preferably 8 nm or more and 50 nm or less.

In the present exemplary embodiment, the average particle diameter of the inorganic particles contained in the resin coating layer and the average thickness of the resin coating layer are determined by the following methods.

The carrier is embedded in an epoxy resin and cut with a microtome to prepare a carrier cross section. An SEM image obtained by capturing the carrier cross section with a scanning electron microscope (SEM) is taken into an image processing analyzer for image analysis. 100 inorganic particles (primary particles) in the resin coating layer are randomly selected, and an equivalent circular diameter (nm) of each particle is calculated and arithmetically averaged to obtain the average particle diameter (nm) of the inorganic particles. The thickness (μm) of the resin coating layer is measured by randomly selecting 10 points per particle of the carrier, and 100 particles of the carrier are further selected to measure thicknesses thereof, and all the thicknesses are arithmetically averaged to obtain the average thickness (μm) of the resin coating layer.

Surfaces of the inorganic particles may be subjected to a hydrophobic treatment. Examples of a hydrophobic treatment agent include known organic silicon compounds having an alkyl group (for example, a methyl group, an ethyl group, a propyl group, a butyl group, and the like), and specific examples thereof include an alkoxysilane compound, a siloxane compound, and a silazane compound. Among these, the hydrophobic treatment agent is preferably a silazane compound, and preferably hexamethyldisilazane. The hydrophobic treatment agent may be used alone or in combination of two or more kinds thereof.

Examples of a method for hydrophobizing the inorganic particles with the hydrophobic treatment agent include a method in which supercritical carbon dioxide is used and the hydrophobic treatment agent is dissolved in the supercritical carbon dioxide to be attached to the surfaces of the inorganic particles, a method in which a solution containing a hydrophobic treatment agent and a solvent for dissolving the hydrophobic treatment agent is applied (for example, sprayed or coated) to the surfaces of the inorganic particles in the atmosphere to attach the hydrophobic treatment agent to the surfaces of the inorganic particles, and a method in which a solution containing a hydrophobic treatment agent and a solvent for dissolving the hydrophobic treatment agent is added to and held in an inorganic particle dispersion liquid in the air, and then a mixed solution of the inorganic particle dispersion liquid and the solution is dried.

From the viewpoint of the density change inhibitory property, a content of the inorganic particles contained in the resin coating layer is preferably 10 mass % or more and 60 mass % or less, more preferably 15 mass % or more and 55 mass % or less, and still more preferably 20 mass % or more and 50 mass % or less, with respect to a total mass of the resin coating layer.

From the viewpoint of the density change inhibitory property, a content of the silica particles contained in the resin coating layer is preferably 10 mass % or more and 60 mass % or less, more preferably 15 mass % or more and 55 mass % or less, and still more preferably 20 mass % or more and 50 mass % or less, with respect to the total mass of the resin coating layer.

From the viewpoints of the long-term image quality stability and the density change inhibitory property, a silicon element concentration at the carrier surface determined by X-ray photoelectron spectroscopy in the carrier according to the present exemplary embodiment is preferably more than 2 atomic % and less than 20 atomic %, more preferably more than 5 atomic % and less than 20 atomic %, and particularly preferably more than 6 atomic % and less than 19 atomic %.

The silicon element concentration at the carrier surface in the present exemplary embodiment shall be measured by the following method.

The carrier is used as a sample and analyzed by X-ray photoelectron spectroscopy (XPS) under the following conditions, and the silicon element concentration (atomic %) is obtained from a peak intensity of each element.

XPS device: Versa Probe II manufactured by ULVAC-PHI, Inc.

Etching gun: argon gun

Acceleration voltage: 5 kV

Emission current: 20 mA

Spatter area: 2 mm×2 mm

Sputter rate: 3 nm/min (in terms of $SiO_2$)

Examples of a resin constituting the resin coating layer include: a styrene-acrylic acid copolymer; polyolefin-based resins such as polyethylene and polypropylene; polystyrene-based or polyvinylidene-based resins such as polystyrene, an acrylic resin, polyacrylonitrile, polyvinyl acetate, polyvinyl alcohol, polyvinyl butyral, polyvinyl chloride, polyvinylcarbazole, polyvinyl ether, and polyvinylketone; a vinyl chloride-vinyl acetate copolymer; straight silicone resins consisting of an organosiloxane bond or a modified product thereof; fluororesins such as polytetrafluoroethylene, polyvinyl fluoride, polyvinylidene fluoride, and polychlorotrifluoroethylene; polyester, polyurethane; polycarbonate; amino resins such as urea and formaldehyde resins; and epoxy resins.

Among these, from the viewpoints of chargeability, controllability of external additive adhesion, and the density change inhibitory property, the resin constituting the resin coating layer preferably contains an acrylic resin, more preferably contains the acrylic resin in an amount of 50 mass % or more, and particularly preferably in an amount of 80 mass % or more with respect to the total mass of the resin in the resin coating layer.

From the viewpoint of the density change inhibitory property, the resin coating layer preferably contains an acrylic resin having an alicyclic structure. A polymerization component of the acrylic resin having an alicyclic structure is preferably a lower alkyl ester of (meth)acrylic acid (for example, (meth)acrylic acid alkyl ester having an alkyl group having 1 or more and 9 or less carbon atoms), and specific examples thereof include methyl (meth)acrylate, ethyl (meth)acrylate, propyl (meth)acrylate, butyl (meth) acrylate, hexyl (meth)acrylate, cyclohexyl (meth)acrylate, and 2-ethylhexyl (meth)acrylate. These monomers may be used alone or in combination of two or more kinds thereof.

The acrylic resin having an alicyclic structure preferably contains cyclohexyl (meth)acrylate as the polymerization component. A content of a monomer unit derived from the cyclohexyl (meth)acrylate contained in the acrylic resin having an alicyclic structure is preferably 75 mass % or more and 100 mass % or less, more preferably 85 mass % or more and 100 mass % or less, and still more preferably 95 mass % or more and 100 mass % or less, with respect to a total mass of the acrylic resin having an alicyclic structure.

A weight average molecular weight of the resin contained in the resin coating layer is preferably less than 300,000, more preferably less than 250,000, still more preferably 5,000 or more and less than 250,000, and particularly preferably 10,000 or more and 200,000 or less. Within the above ranges, smoothness of the resin-coated carrier surface is increased, so that an amount of the external additive adhering to the carrier is reduced, and the density change inhibitory property is more excellent.

The resin coating layer may contain conductive particles for the purpose of controlling charging and resistance. Examples of the conductive particles include carbon black and conductive particles among the above-mentioned inorganic particles.

Examples of a method for forming the resin coating layer on the surfaces of the magnetic particle include a wet production method and a dry production method. The wet production method is a production method using a solvent that dissolves or disperses the resin constituting the resin coating layer. On the other hand, the dry production method is a production method that does not use the above solvent.

Examples of the wet production method include an immersion method in which the magnetic particles are immersed in a resin liquid for forming the resin coating layer to be coated, a spray method in which a resin liquid for forming the resin coating layer is sprayed on the surfaces of the magnetic particles, a fluidized bed method in which a resin liquid for forming the resin coating layer is sprayed while the magnetic particles are in a state of being fluidized in a fluidized bed, and a kneader coater method in which the magnetic particles and a resin liquid for forming the resin coating layer are mixed in a kneader coater to remove a solvent. These production methods may be repeated or combined.

The resin liquid for forming the resin coating layer used in the wet production method is prepared by dissolving or dispersing a resin, inorganic particles, and other components in a solvent. The solvent is not particularly limited, and for example, aromatic hydrocarbons such as toluene and xylene, ketones such as acetone and methyl ethyl ketone, ethers such as tetrahydrofuran and dioxane, and the like may be used.

Examples of the dry production method include a method of forming the resin coating layer by heating a mixture of the magnetic particles and a resin for forming the resin coating layer in a dry state. Specifically, for example, the magnetic particles and the resin for forming the resin coating layer are mixed in a gas phase and heated and melted to form the resin coating layer.

The ratio B/A can be controlled by production conditions. For example, in a production method in which the kneader coater method is repeated plural times (for example, twice) to form the resin coating layer stepwise, in a final kneader coater step, the ratio B/A is controlled by adjusting a mixing time between particles to be coated and a resin liquid for forming the resin coating layer. The longer the mixing time in the final kneader coater step, the smaller the ratio B/A tends to be.

Alternatively, for example, in a production method in which a liquid composition containing inorganic particles (a resin may or may not be contained) is applied by a spray method to the resin-coated carrier surface manufactured by the kneader coater method, the ratio B/A is controlled by adjusting the particle diameter and the content of the inorganic particles contained in the liquid composition or an amount of the liquid composition applied to the resin-coated carrier.

An exposed area ratio of the magnetic particle at the carrier surface is preferably 5% or more and 30% or less, more preferably 7% or more and 25% or less, and still more preferably 10% or more and 25% or less. The exposed area ratio of the magnetic particle in the carrier can be controlled by the amount of the resin used for forming the resin coating layer, and the larger the amount of the resin with respect to the amount of the magnetic particles, the smaller the exposed area ratio.

The exposed area ratio of the magnetic particle at the carrier surface is a value obtained by the following method.

A target carrier and magnetic particle obtained by removing the resin coating layer from the target carrier are prepared. Examples of a method for removing the resin coating layer from the carrier include a method of dissolving the resin component with an organic solvent to remove the resin coating layer, and a method of removing the resin component by heating at about 800° C. to remove the resin coating layer. The carrier and the magnetic particle are used as measurement samples, and Fe concentrations (atomic %) on surfaces of the samples are quantified by XPS, and (Fe concentration of the carrier)/(Fe concentration of the magnetic particle)×100 is calculated and used as the exposed area ratio (%) of the magnetic particle.

From the viewpoint of the density change inhibitory property, the volume average particle diameter of the carrier is preferably 25 μm or more and 36 μm or less, more preferably 26 μm or more and 35 μm or less, and particularly preferably 28 μm or more and 34 μm or less.

(Electrostatic Charge Image Developer)

The developer according to the present exemplary embodiment is a two-component developer containing the electrostatic charge image developing carrier according to the present exemplary embodiment and a toner. The toner contains toner particles and, if necessary, an external additive.

A mixing ratio (mass ratio) of the carrier and the toner in the developer is preferably carrier:toner=100:1 to 100:30, more preferably 100:3 to 100:20.

<Toner Particles>

The toner particles contain, for example, a binder resin, and if necessary, a colorant, a mold releasing agent, and other additives.

—Binder Resin—

Examples of the binder resin include vinyl-based resins made of a homopolymer of monomers such as styrenes (such as styrene, parachlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or a copolymer obtained by combining two or more kinds of these monomers.

Examples of the binder resin include non-vinyl-based resins such as an epoxy resin, a polyester resin, a polyurethane resin, a polyamide resin, a cellulose resin, a polyether resin, and a modified resin, a mixture of the non-vinyl-based resin and the vinyl-based resin, or a graft polymer obtained by polymerizing a vinyl-based monomer in the presence of these non-vinyl-based resins.

These binder resins may be used alone or in combination of two or more kinds thereof.

The binder resin is suitably a polyester resin.

Examples of the polyester resin include known an amorphous polyester resin. As the polyester resin, a crystalline polyester resin may be used in combination with the amorphous polyester resin. However, the crystalline polyester resin may be used in a range in which a content thereof is 2 mass % or more and 40 mass % or less (preferably 2 mass % or more and 20 mass % or less) with respect to a total amount of the binder resin.

"Crystalline" of a resin refers to having a clear endothermic peak rather than a stepwise endothermic change in differential scanning calorimetry (DSC), and specifically means that a half width of the endothermic peak when measured at a heating rate of 10 (° C./min) is within 10° C. On the other hand, "amorphous" of a resin means a half width of higher than 10° C., showing a stepwise endothermic change, or not showing a clear endothermic peak.

Amorphous Polyester Resin

Examples of the amorphous polyester resin include a condensed polymer of a polycarboxylic acid and a polyhydric alcohol. As the amorphous polyester resin, a commercially available product may be used, or a synthetic resin may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower (for example, having 1 or more and 5 or less carbon atoms) alkyl esters thereof. Among these, the polycarboxylic acid is preferably, for example, an aromatic dicarboxylic acid.

As the polycarboxylic acid, a trivalent or higher carboxylic acid having a crosslinked structure or a branched structure may be used in combination with the dicarboxylic acid. Examples of the trivalent or higher carboxylic acid include trimellitic acid, pyromellitic acid, anhydrides thereof, and lower (for example, having 1 or more and 5 or less carbon atoms) alkyl esters thereof.

The polycarboxylic acid may be used alone or in combination of two or more kinds thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol and hydrogenated bisphenol A), and aromatic diols (such as an ethylene oxide adduct of bisphenol A and a propylene oxide adduct of bisphenol A). Among these, the polyhydric alcohol is preferably, for example, an aromatic diol or an alicyclic diol, and more preferably an aromatic diol.

As the polyhydric alcohol, a trihydric or higher polyhydric alcohol having a crosslinked structure or a branched structure may be used in combination with the diol.

Examples of the trihydric or higher polyhydric alcohol include glycerin, trimethylolpropane, and pentaerythritol.

The polyhydric alcohol may be used alone or in combination of two or more kinds thereof.

A glass transition temperature (Tg) of the amorphous polyester resin is preferably 50° C. or higher and 80° C. or lower, and more preferably 50° C. or higher and 65° C. or lower.

The glass transition temperature is obtained from a DSC curve obtained by the differential scanning calorimetry (DSC), and is more specifically obtained by the "extrapolated glass transition onset temperature" described in a method for obtaining the glass transition temperature of JIS K 7121:1987 "Method for measuring glass transition temperature of plastics".

A weight average molecular weight (Mw) of the amorphous polyester resin is preferably 5,000 or more and 1,000,000 or less, and more preferably 7,000 or more and 500,000 or less.

A number average molecular weight (Mn) of the amorphous polyester resin is preferably 2,000 or more and 100,000 or less.

A molecular weight distribution Mw/Mn of the amorphous polyester resin is preferably 1.5 or more and 100 or less, and more preferably 2 or more and 60 or less.

The weight average molecular weight and the number average molecular weight are measured by gel permeation chromatography (GPC). Molecular weight measurement by GPC is performed by using a GPCHLC-8120GPC manufactured by Tosoh Corporation as a measurement device, using a column TSKgel Super HM-M (15 cm) manufactured by Tosoh Corporation, and using a THF solvent. The weight average molecular weight and the number average molecular weight are calculated from measurement results using a molecular weight calibration curve prepared using a monodispersed polystyrene standard sample.

The amorphous polyester resin is obtained by a known production method. Specifically, for example, the amorphous polyester resin is obtained by a method in which the polymerization temperature is set to 180° C. or higher and 230° C. or lower, the pressure inside a reaction system is reduced as necessary, and reaction is performed while removing water or alcohols generated during condensation.

When a raw material monomer is not dissolved or compatible at the reaction temperature, a solvent having a high boiling point may be added as a dissolution aid to dissolve the monomer. In this case, a polycondensation reaction is carried out while distilling off the dissolution aid. When there is a monomer with poor compatibility in a copolymerization reaction, the monomer having poor compatibility may be firstly condensed with an acid or alcohol to be polycondensed with the monomer having poor compatibility, and then the obtained product may be polycondensed with a main component.

Crystalline Polyester Resin

Examples of the crystalline polyester resin include a polycondensate of a polycarboxylic acid and a polyhydric alcohol. As the crystalline polyester resin, a commercially available product may be used, or a synthetic resin may be used.

Here, in order to easily form a crystal structure, the crystalline polyester resin is preferably a polycondensate using a linear aliphatic polymerizable monomer rather than a polymerizable monomer having an aromatic ring.

Examples of the polycarboxylic acid include aliphatic dicarboxylic acids (such as oxalic acid, succinic acid, glutaric acid, adipic acid, suberic acid, azelaic acid, sebacic acid, 1,9-nonandicarboxylic acid, 1,10-decandicarboxylic acid, 1,12-dodecanediocarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides thereof, and lower (for example, having 1 or more and 5 or less carbon atoms) alkyl esters thereof.

As the polycarboxylic acid, a trivalent or higher carboxylic acid having a crosslinked structure or a branched structure may be used in combination with the dicarboxylic acid. Examples of the trivalent carboxylic acid include aromatic carboxylic acids (such as 1,2,3-benzenetricarboxylic acid, 1,2,4-benzenetricarboxylic acid, and 1,2,4-naphthalenetricarboxylic acid), anhydrides thereof, and lower (for example, having 1 or more and 5 or less carbon atoms) alkyl esters thereof.

As the polycarboxylic acid, a dicarboxylic acid having a sulfonic acid group and a dicarboxylic acid having an ethylenic double bond may be used in combination with these dicarboxylic acids.

The polycarboxylic acid may be used alone or in combination of two or more kinds thereof.

Examples of the polyhydric alcohol include aliphatic diols (such as linear aliphatic diols having 7 or more and 20 or less carbon atoms in the main chain part). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecandiol, 1,14-tetradecanediol, 1,18-octadecanediol, and 1,20-eicosanediol. Among these, the aliphatic diol is preferably 1,8-octanediol, 1,9-nonanediol, or 1,10-decanediol.

As the polyhydric alcohol, a trihydric or higher alcohol having a crosslinked structure or a branched structure may be used in combination with the diol. Examples of the trihydric or higher alcohol include glycerin, trimethylolethane, trimethylolpropane, and pentaerythritol.

The polyhydric alcohol may be used alone or in combination of two or more kinds thereof.

Here, the polyhydric alcohol preferably has an aliphatic diol content of 80 mol % or more, and preferably 90 mol % or more.

A melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is obtained from a DSC curve obtained by the differential scanning calorimetry (DSC) according to the "melting peak temperature" described in a method for obtaining the melting temperature of JIS K7121:1987 "Method for measuring transition temperature of plastics".

A weight average molecular weight (Mw) of the crystalline polyester resin is preferably 6,000 or more and 35,000 or less.

The crystalline polyester resin can be obtained by, for example, a known production method same as the amorphous polyester resin.

A content of the binder resin is preferably 40 mass % or more and 95 mass % or less, more preferably 50 mass % or more and 90 mass % or less, and still more preferably 60 mass % or more and 85 mass % or less with respect to a total amount of the toner particles.

—Colorant—

Examples of the colorant include pigments such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more kinds thereof.

As the colorant, a surface-treated colorant may be used as necessary, or the colorant may be used in combination with a dispersant. Plural kinds of colorants may be used in combination.

A content of the colorant is preferably 1 mass % or more and 30 mass % or less, and more preferably 3 mass % or more and 15 mass % or less, with respect to the total amount of the toner particles.

—Mold Releasing Agent—

Examples of the mold releasing agent include hydrocarbon wax, natural wax such as carnauba wax, rice wax, and candelilla wax, synthetic or mineral/petroleum wax such as montan wax, and ester wax such as fatty acid ester and montanic acid ester. The mold releasing agent is not limited thereto.

The melting temperature of the mold releasing agent is preferably 50° C. or higher and 110° C. or lower, and more preferably 60° C. or higher and 100° C. or lower.

The melting temperature is obtained from a DSC curve obtained by the differential scanning calorimetry (DSC) according to the "melting peak temperature" described in a method for obtaining the melting temperature of JIS K7121: 1987 "Method for measuring transition temperature of plastics".

A content of the mold releasing agent is preferably 1 mass % or more and 20 mass % or less, and more preferably 5 mass % or more and 15 mass % or less, with respect to the total amount of the toner particles.

—Other Additives—

Examples of the other additives include known additives such as a magnetic body, an electrostatic charge control agent, and an inorganic powder. These additives are contained in the toner particles as internal additives.

—Properties of Toner Particles—

The toner particles may be toner particles having a single layer structure, or may be toner particles having a so-called core-shell structure made of a core portion (core particles) and a coating layer (shell layer) coating the core portion.

The toner particles having a core-shell structure may be made of, for example, a core portion made of a binder resin and, if necessary, other additives such as a colorant and a mold releasing agent, and a coating layer made of a binder resin.

A volume average particle diameter (D50v) of the toner particles is preferably 2 μm or more and 10 μm or less, and more preferably 4 μm or more and 8 μm or less.

The volume average particle diameter (D50v) of the toner particles is measured using Coulter Multisizer II (manufactured by Beckman Coulter, Inc.) and the electrolytic solution is ISOTON-II (manufactured by Beckman Coulter, Inc.).

During measurement, 0.5 mg or more and 50 mg or less of a measurement sample is added to 2 ml of a 5 mass % aqueous solution of a surfactant (preferably sodium alkylbenzene sulfonate) as a dispersant. The obtained mixture is added to 100 ml or more and 150 ml or less of the electrolytic solution.

The electrolytic solution in which the sample is suspended is dispersed for 1 minute with an ultrasonic disperser, and the particle size distribution of particles having a particle diameter in a range of 2 μm or more and 60 μm or less is measured by the Coulter Multisizer II using an aperture having an aperture diameter of 100 μm. The number of the particles sampled is 50,000. A divided particle size range (channel) is set and a volume-based particle size distribution is obtained. Then, a cumulative distribution is drawn from a small particle diameter side and a particle diameter corresponding to the cumulative percentage of 50% with respect to all the particles is the volume average particle diameter D50V.

An average circularity of the toner particles is preferably 0.94 or more and 1.00 or less, and more preferably 0.95 or more and 0.98 or less.

The average circularity of the toner particles is obtained by (circle equivalent perimeter)/(perimeter) [(perimeter of a circle having the same projected area as a particle image)/(perimeter of the projected particle image)]. Specifically, the average circularity is a value measured by the following method.

First, the toner particles to be measured are sucked and collected to form a flat flow, and flash light is emitted instantly to capture a particle image as a still image. The average circularity is obtained by a flow-type particle image analyzer (FPIA-3000 manufactured by Sysmex Corporation) that analyzes the particle image. The number of samples for obtaining the average circularity is 3,500.

When the toner contains an external additive, the toner (developer) to be measured is dispersed in water containing a surfactant, and then an ultrasonic treatment is performed to obtain toner particles from which the external additive is removed.

(Method for Producing Toner Particles)

The toner particles may be manufactured by either a dry production method (such as a kneading pulverization method) or a wet production method (such as an aggregation and coalescence method, a suspension polymerization method, and a dissolution suspension method). These production methods are not particularly limited, and known production methods are adopted. Among these, it is preferable to obtain the toner particles by the aggregation and coalescence method.

Specifically, for example, when the toner particles are produced by the aggregation and coalescence method, the toner particles are produced through a step of preparing a resin particle dispersion liquid in which resin particles to be a binder resin are dispersed (resin particle dispersion liquid preparation step), a step of aggregating the resin particles (other particles if necessary) in the resin particle dispersion liquid (in a dispersion liquid after mixing with another particle dispersion liquid if necessary) to form agglomerated particles (agglomerated particle forming step), and a step of heating an agglomerated particle dispersion liquid in which the agglomerated particles are dispersed and fusing and coalescing the agglomerated particles to form the toner particles (fusion and coalescence step).

Details of each step will be described below.

In the following description, a method for obtaining toner particles containing a colorant and a mold releasing agent will be described, but the colorant and the mold releasing agent are used as needed. Of course, other additives other than the colorant and the mold releasing agent may be used.

—Resin Particle Dispersion Liquid Preparation Step—

Along with the resin particle dispersion liquid in which the resin particles to be the binder resin are dispersed, for example, a colorant particle dispersion liquid in which colorant particles are dispersed and a mold releasing agent particle dispersion liquid in which mold releasing agent particles are dispersed are prepared.

The resin particle dispersion liquid is prepared by, for example, dispersing the resin particles in a dispersion medium with a surfactant.

Examples of the dispersion medium used in the resin particle dispersion liquid include an aqueous medium.

Examples of the aqueous medium include water such as distilled water and ion-exchanged water, and alcohols. These media may be used alone or in combination of two or more kinds thereof.

Examples of the surfactant include a sulfate-based, sulfonate-based, phosphate-based, soap-based or other anionic surfactant, an amine salt type or quaternary ammonium salt type cationic surfactant, and a polyethylene glycol-based, alkylphenol ethylene oxide adduct-based, or polyhydric alcohol-based nonionic surfactant. Among these, the anionic surfactant and the cationic surfactant are particularly mentioned. The nonionic surfactant may be used in combination with the anionic surfactant or the cationic surfactant.

The surfactant may be used alone or in combination of two or more kinds thereof.

Examples of a method for dispersing the resin particles in the dispersion medium in the resin particle dispersion liquid include general dispersion methods such as a rotary shear homogenizer, a ball mill having a medium, a sand mill, and a dyno mill. Depending on a type of the resin particles, the resin particles may be dispersed in the dispersion medium by a phase inversion emulsification method. In the phase inversion emulsification method, a resin to be dispersed is dissolved in a hydrophobic organic solvent in which the resin is soluble, and a base is added to an organic continuous phase (O phase) to neutralize the resin, and then an aqueous medium (W phase) is added to perform phase inversion from W/O to O/W, and the resin is dispersed in the aqueous medium in the form of particles.

A volume average particle diameter of the resin particles dispersed in the resin particle dispersion liquid is, for example, preferably 0.01 μm or more and 1 μm or less, more preferably 0.08 μm or more and 0.8 μm or less, and still more preferably 0.1 μm or more and 0.6 μm or less.

The volume average particle diameter D50v of the resin particles is calculated by the volume-based particle size distribution obtained by measurement with a laser diffraction type particle size distribution measuring device (for example, LA-700 manufactured by HORIBA, Ltd.). A divided particle size range is set and the volume-based particle size distribution is obtained. Then, a cumulative distribution is drawn from a small particle diameter side and a particle diameter corresponding to the cumulative percentage of 50% with respect to all the particles is the volume average particle diameter D50v. The volume average particle diameters of the particles in another dispersion liquid is measured in the same manner.

A content of the resin particles contained in the resin particle dispersion liquid is preferably 5 mass % or more and 50 mass % or less, and more preferably 10 mass % or more and 40 mass % or less.

Similar to the resin particle dispersion liquid, for example, the colorant particle dispersion liquid and the mold releasing agent particle dispersion liquid are also prepared. That is, the volume average particle diameter, dispersion medium, dispersion method, and content of particles of the particles in the resin particle dispersion liquid are the same for the colorant particles dispersed in the colorant particle dispersion liquid and the mold releasing agent particles dispersed in the mold releasing agent particle dispersion liquid.

—Agglomerated Particle Forming Step—

Next, the resin particle dispersion liquid, the colorant particle dispersion liquid, and the mold releasing agent particle dispersion liquid are mixed.

Then, the agglomerated particles containing the resin particles, the colorant particles, and the mold releasing agent particles having a diameter close to the diameter of the target toner particles are formed by hetero-aggregating the resin particles, the colorant particles, and the release agent particles.

Specifically, for example, the agglomerated particles are formed by adding an aggregating agent to the mixed dispersion liquid, adjusting the pH of the mixed dispersion liquid to acidic (for example, a pH of 2 or more and 5 or less), adding a dispersion stabilizer as needed, heating the mixed dispersion liquid to a temperature close to the glass transition temperature (specifically, for example, the glass transition temperature of the resin particles—30° C. or higher and the glass transition temperature—10° C. or lower) of the resin particles, and aggregating the particles dispersed in the mixed dispersion liquid.

In the agglomerated particle forming step, for example, while the mixed dispersion liquid is stirred with a rotary shear homogenizer, the aggregating agent is added at room temperature (for example, 25° C.), the pH of the mixed dispersion liquid may be adjusted to acidic (for example, a pH of 2 or more and 5 or less), the dispersion stabilizer may be added if necessary, and then heating may be performed.

Examples of the aggregating agent include a surfactant having a polarity opposite to that of the surfactant contained in the mixed dispersion liquid, an inorganic metal salt, and a divalent or higher metal complex. When the metal complex is used as the aggregating agent, an amount of the surfactant used is reduced and the chargeability is improved.

An additive that forms a complex or a similar bond with metal ions of the aggregating agent may be used together with the aggregating agent, if necessary. The additive is preferably a chelating agent.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid, and aminocarboxylic acids such as iminodiacetic acid (IDA), nitrilotriacetic acid (NTA), and ethylenediaminetetraacetic acid (EDTA).

An amount of the chelating agent added is preferably 0.01 parts by mass or more and 5.0 parts by mass or less, and more preferably 0.1 parts by mass or more and less than 3.0 parts by mass, with respect to 100 parts by mass of the resin particles.

—Fusion and Coalescence Step—

Next, the agglomerated particle dispersion liquid in which the agglomerated particles are dispersed is heated to, for example, a temperature equal to or higher than the glass transition temperature of the resin particles (for example, a temperature higher than the glass transition temperature of the resin particles by 10° C. to 30° C.), so that the agglomerated particles are fused and coalesced to form the toner particles.

The toner particles are obtained through the above steps.

The toner particles may be produced through a step of obtaining an agglomerated particle dispersion liquid in which agglomerated particles are dispersed, then further mixing the agglomerated particle dispersion liquid and the resin particle dispersion liquid in which the resin particles are dispersed, and performing aggregation to further adhere and aggregate the resin particles to surfaces of the agglomerated particles to form second agglomerated particles, and a step of heating a second agglomerated particle dispersion liquid in which the second agglomerated particles are dispersed to fuse and coalesce the second agglomerated particles to form the toner particles having a core-shell structure.

After the fusion and coalescence step is completed, the toner particles formed in the solution are subjected to a known washing step, solid-liquid separation step, and drying step to obtain dried toner particles. In the washing step, from the viewpoint of the chargeability, it is preferable to sufficiently perform replacement washing with ion-exchanged water. In the solid-liquid separation step, suction filtration, pressure filtration, and the like may be performed from the viewpoint of productivity. In the drying step, from the viewpoint of productivity, freeze-drying, air-flow drying, fluid-drying, vibration-type fluid-drying, and the like may be performed.

Then, the toner according to the present exemplary embodiment is produced by, for example, adding an external additive to the obtained dried toner particles and mixing these materials. The mixing may be carried out by, for example, a V blender, a Henschel mixer, a Loedige mixer, or the like. Further, if necessary, coarse particles in the toner may be removed by using a vibration sieving machine, a wind sieving machine, or the like.

—External Additive—

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaOSiO_2$, $K_2O \cdot (TiO_2)_n$, $Al_2O_3 \cdot 2SiO_2$, $CaCO_3$, $MgCO_3$, $BaSO_4$, and $MgSO_4$.

The surfaces of the inorganic particles as the external additive are preferably subjected to a hydrophobic treatment. The hydrophobic treatment is performed by, for example, immersing the inorganic particles in a hydrophobic treatment agent. The hydrophobic treatment agent is not particularly limited, and examples thereof include a silane coupling agent, a silicone oil, a titanate coupling agent, and an aluminum coupling agent. The hydrophobic treatment agent may be used alone or in combination of two or more kinds thereof.

An amount of the hydrophobic treatment agent is generally, for example, 1 part by mass or more and 10 parts by mass or less with respect to 100 parts by mass of the inorganic particles.

Examples of the external additive also include resin particles (resin particles such as polystyrene, polymethylmethacrylate, and melamine resin), and cleaning activators (for example, metal salts of higher fatty acids represented by zinc stearate, and particles of a fluoropolymer).

An amount of the external additive externally added is, for example, preferably 0.01 mass % or more and 5 mass % or less, and more preferably 0.01 mass % or more and 2.0 mass % or less, with respect to the toner particles.

<Image Forming Apparatus and Image Forming Method>

An image forming apparatus according to the present exemplary embodiment includes: an image carrier; a charging unit that charges a surface of the image carrier; an electrostatic charge image forming unit that forms an electrostatic charge image on the surface of the charged image carrier; a developing unit that accommodates an electrostatic charge image developer and develops, by the electrostatic charge image developer, an electrostatic charge image formed on the surface of the image carrier as a toner imager; a transfer unit that transfers the toner image formed on the surface of the image carrier to a surface of a recording medium; and a fixing unit that fixes the toner image transferred to the surface of the recording medium. As the electrostatic charge image developer, the electrostatic charge image developer according to the present exemplary embodiment is applied.

In the image forming apparatus according to the present exemplary embodiment, an image forming method (an image forming method according to the present exemplary embodiment) is performed, which includes: a charging step of charging the surface of the image carrier; an electrostatic charge image forming step of forming the electrostatic charge image on the surface of the charged image carrier; an image developing step of developing, by the electrostatic charge image developer, the electrostatic charge image formed on the surface of the image carrier as the toner image; a transfer step of transferring the toner image formed on the surface of the image carrier to the surface of the recording medium; and a fixing step of fixing the toner image transferred to the surface of the recording medium.

A known image forming apparatus such as a direct transfer type apparatus that directly transfers the toner image formed on the surface of the image carrier to the recording medium, an intermediate transfer type apparatus that primarily transfers the toner image formed on the surface of the image carrier to a surface of an intermediate transfer body, and secondarily transfers the toner image transferred to the surface of the intermediate transfer body to the surface of the recording medium, an apparatus provided with a cleaning unit for cleaning the surface of the image carrier after the transfer of the toner image and before charging, and an apparatus provided with a discharging unit for discharging the surface of the image carrier by irradiation with discharging light after the transfer of the toner image and before the charging, is applied to the image forming apparatus according to the present exemplary embodiment.

When the image forming apparatus according to the present exemplary embodiment is an intermediate transfer type apparatus, the transfer unit includes, for example, an intermediate transfer body on which a toner image is transferred onto a surface thereof, a primary transfer unit that primarily transfers the toner image formed on the surface of the image carrier onto the surface of the intermediate transfer body, and a secondary transfer unit that secondarily transfers the toner image transferred on the surface of the intermediate transfer body onto the surface of the recording medium.

In the image forming apparatus according to the present exemplary embodiment, for example, a part including the developing unit may have a cartridge structure (process cartridge) configured to be attached to and detached from the image forming apparatus. As the process cartridge, for example, a process cartridge that accommodates the electrostatic charge image developer according to the present exemplary embodiment and provided with a developing unit is preferably used.

Hereinafter, an example of the image forming apparatus according to the present exemplary embodiment will be described, but the image forming apparatus is not limited thereto. In the following description, main parts shown in the drawings will be described, and description of other parts will be omitted.

FIG. 1 is a schematic configuration diagram illustrating the image forming apparatus according to the present exemplary embodiment.

The image forming apparatus illustrated in FIG. 1 includes first to fourth electrophotographic image forming units 10Y, 10M, 10C, and 10K (image forming units) that output images of respective colors of yellow (Y), magenta (M), cyan (C), and black (K) based on image data subjected to color separation. These image forming units (hereinafter may be simply referred to as "unit") 10Y, 10M, 10C, and 10K are arranged side by side at a predetermined distance from each other in a horizontal direction. These units 10Y, 10M, 10C, and 10K may be process cartridges that are configured to be attached to and detached from the image forming apparatus.

Above the units 10Y, 10M, 10C, and 10K, an intermediate transfer belt (an example of the intermediate transfer body) 20 extends through respective units. The intermediate transfer belt 20 is provided by being wound around a drive roller 22 and a support roller 24, and travels in a direction from the first unit 10Y to the fourth unit 10K. A force is applied to the support roller 24 in a direction away from the drive roller 22 by a spring or the like (not shown), and tension is applied to the intermediate transfer belt 20 wound around the drive roller 22 and the support roller 24. An intermediate transfer body cleaning device 30 is provided on a side surface of an image carrier of the intermediate transfer belt 20 so as to face the drive roller 22.

Yellow, magenta, cyan, and black toners contained in toner cartridges 8Y, 8M, 8C, and 8K are supplied to developing devices 4Y, 4M, 4C, and 4K (an example of the developing unit) of the units 10Y, 10M, 10C, and 10K, respectively.

Since the first to fourth units 10Y, 10M, 10C, and 10K have the same configuration and operation, here, the first unit 10Y, which is arranged on an upstream side in a traveling direction of the intermediate transfer belt and forms a yellow image, will be described as a representative. 1M, 1C, and 1K in the second to fourth units 10M, 10C, and 10K are photoconductors corresponding to a photoconductor 1Y in the first unit 10Y; 2M, 2C and 2K are charging rollers corresponding to a charging roller 2Y; 3M, 3C, and 3K are laser beams corresponding to a laser beam 3Y; and 6M, 6C, and 6K are photoconductor cleaning devices corresponding to a photoconductor cleaning device 6Y.

The first unit 10Y includes the photoconductor 1Y (an example of the image carrier) that acts as an image carrier. Around the photoconductor 1Y, the following members are arranged in order: the charging roller (an example of the charging unit) 2Y that charges a surface of the photoconductor 1Y to a predetermined potential; an exposure device (an example of the electrostatic charge image forming unit) 3 that exposes the charged surface with the laser beam 3Y based on a color-separated image signal to form an electrostatic charge image; the developing device (an example of the developing unit) 4Y that supplies a charged toner to the electrostatic charge image to develop the electrostatic charge image; a primary transfer roller 5Y (an example of the primary transfer unit) that transfers the developed toner image onto the intermediate transfer belt 20; and the photoconductor cleaning device (an example of the cleaning unit) 6Y that removes the toner remaining on the surface of the photoconductor 1Y after the primary transfer.

The primary transfer roller 5Y is arranged on an inner side of the intermediate transfer belt 20 and is provided at a position facing the photoconductor 1Y. A bias power supply (not shown) that applies a primary transfer bias is connected to each of the primary transfer rollers 5Y, 5M, 5C, and 5K of respective units. Each bias power supply changes a value of the transfer bias applied to each primary transfer roller under the control of a controller (not shown).

Hereinafter, an operation of forming a yellow image in the first unit 10Y will be described.

First, prior to the operation, the surface of the photoconductor 1Y is charged to a potential of −600 V to −800 V by using the charging roller 2Y.

The photoconductor 1Y is formed by laminating a photoconductive layer on a conductive substrate (for example, having a volume resistivity of $1\times10^{-6}$ Ω·cm or less at 20° C.). The photoconductive layer usually has high resistance (resistance of general resin), but has a property that when irradiated with a laser beam, the specific resistance of the portion irradiated with the laser beam changes. Therefore, the charged surface of the photoconductor 1Y is irradiated with the laser beam 3Y from the exposure device 3 in accordance with yellow image data sent from the controller (not shown). As a result, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to flow charges charged on the surface of the photoconductor 1Y and by, on the other hand, leaving charges of a portion not irradiated with the laser beam 3Y.

The electrostatic charge image formed on the photoconductor 1Y rotates to a predetermined developing position as traveling of the photoconductor 1Y. Then, at this developing position, the electrostatic charge image on the photoconductor 1Y is developed and visualized as a toner image by the developing device 4Y.

In the developing device 4Y, for example, an electrostatic charge image developer containing at least a yellow toner and a carrier is accommodated. The yellow toner is triboelectrically charged by being stirred inside the developing device 4Y, and has charges of the same polarity (negative polarity) as the charges charged on the photoconductor 1Y and is carried on a developer roller (an example of a developer holder). Then, when the surface of the photoconductor 1Y passes through the developing device 4Y, the yellow toner electrostatically adheres to a discharged latent image portion on the surface of the photoconductor 1Y, and the latent image is developed by the yellow toner. The photoreceptor 1Y on which the yellow toner image is formed continuously travels at a predetermined speed, and the toner image developed on the photoconductor 1Y is conveyed to a predetermined primary transfer position.

When the yellow toner image on the photoconductor 1Y is conveyed to the primary transfer position, a primary transfer bias is applied to the primary transfer roller 5Y, an electrostatic force from the photoconductor 1Y to the primary transfer roller 5Y acts on the toner image, and the toner image on the photoconductor 1Y is transferred onto the intermediate transfer belt 20. The transfer bias applied at this time has a polarity (+) opposite to the polarity (−) of the toner, and is controlled to, for example, +10 μA by the controller (not shown) in the first unit 10Y.

On the other hand, the toner remaining on the photoconductor 1Y is removed and collected by the photoconductor cleaning device 6Y.

The primary transfer biases applied to the primary transfer rollers 5M, 5C, and 5K of the second unit 10M and the subsequent units are also controlled in the same manner as in the first unit.

In this way, the intermediate transfer belt 20 to which the yellow toner image is transferred by the first unit 10Y is sequentially conveyed through the second to fourth units 10M, 10C, and 10K, and toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roller 24 in contact with an inner surface of the intermediate transfer belt, and a secondary transfer roller (an example of a secondary transfer unit) 26 arranged on an image carrying surface side of the intermediate transfer belt 20. On the other hand, a recording paper (an example of the recording medium) P is fed through a supply mechanism into a gap where the secondary transfer roller 26 and the intermediate transfer belt 20 are in contact with each other at a predetermined timing, and a secondary transfer bias is applied to the support roller 24. The transfer bias applied at this time has the same polarity (−) as the polarity (−) of the toner. An electrostatic force from the intermediate transfer belt 20 to the recording paper P acts on the toner image, and the toner image on the intermediate transfer belt 20 is transferred onto the recording paper P. The secondary transfer bias at this time is determined according to the resistance detected by a resistance detecting unit (not shown) that detects the resistance of the secondary transfer unit, and is subjected to voltage control.

Thereafter, the recording paper P is sent to a pressure contact portion (nip portion) of a pair of fixing rollers in a fixing device (an example of the fixing unit) 28, and the toner image is fixed onto the recording paper P, thereby forming a fixed image.

Examples of the recording paper P onto which the toner image is transferred include plain paper used in electrophotographic copiers and printers. As the recording medium, in addition to the recording paper P, an OHP sheet or the like may be used.

In order to further improve the smoothness of an image surface after fixing, the surface of the recording paper P is also preferably smooth. For example, coated paper obtained by coating the surface of the plain paper with a resin or the like, art paper for printing, or the like is preferably used.

The recording paper P, on which the fixing of the color image is completed, is conveyed out toward a discharge unit, and a series of color image forming operations is completed.

<Process Cartridge>

The process cartridge according to the present exemplary embodiment includes a developing unit that accommodates the electrostatic charge image developer according to the present exemplary embodiment and develops, by the electrostatic charge image developer, the electrostatic charge image formed on the surface of the image carrier as the toner image, and is configured to be attached to and detached from the image forming apparatus.

The process cartridge according to the present exemplary embodiment is not limited to the above configuration and may be configured to include a developing unit and, if necessary, at least one selected from other units such as an image carrier, a charging unit, an electrostatic charge image forming unit, and a transfer unit.

Hereinafter, an example of the process cartridge according to the present exemplary embodiment will be shown, but the process cartridge is not limited thereto. In the following description, main parts shown in the drawings will be described, and description of other parts will be omitted.

Figure 2:
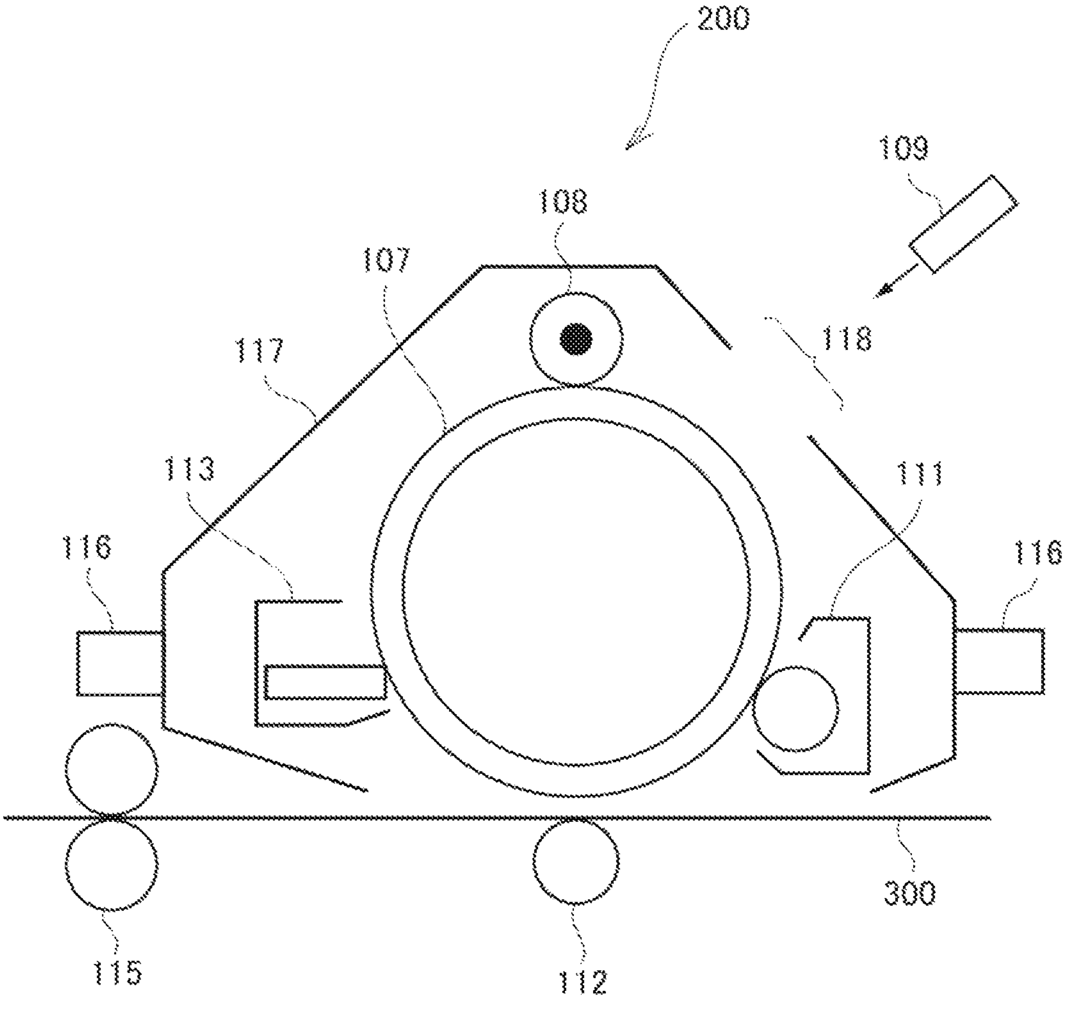
FIG. 2 is a schematic configuration diagram illustrating an example of a process cartridge configured to be attached to and detached from the image forming apparatus according to the present exemplary embodiment.

FIG. 2 is a schematic configuration diagram illustrating the process cartridge according to the present exemplary embodiment.

A process cartridge 200 shown in FIG. 2 is formed as a cartridge by, for example, integrally combining and holding a photoconductor 107 (an example of the image carrier), a charging roller 108 (an example of the charging unit), an image developing device 111 (an example of the developing unit), and a photoconductor cleaning device 113 (an example of a cleaning unit) provided around the photoconductor 107 by a housing 117 provided with a mounting rail 116 and an opening 118 for exposure.

In FIG. 2, 109 denotes an exposure device (an example of the electrostatic charge image forming unit), 112 denotes a transfer device (an example of the transfer unit), 115 denotes a fixing device (an example of the fixing unit), and 300 denotes recording paper (an example of the recording medium).

EXAMPLES

Hereinafter, the exemplary embodiment of the invention will be described in detail with reference to Examples, but the exemplary embodiment of the invention is not limited to these Examples. In the following description, all "parts" and "%" are based on mass unless otherwise specified.

In the following description, the volume average particle diameter means a particle diameter D50v corresponding to the cumulative percentage of 50% in a volume-based particle size distribution which is drawn from the side of the small diameter.

<Preparation of Toner>

—Preparation of Colorant Particle Dispersion Liquid 1—

Cyan pigment (Copper Phthalocyanine B15:3 (manufactured by Dainichiseika Color & Chemicals Mfg. Co., Ltd.)): 50 parts by mass Anionic surfactant: Neogen SC (manufactured by DKS Co. Ltd.): 5 parts by mass Ion-exchanged water: 200 parts by mass The above materials are mixed and dispersed for 5 minutes using Ultra Turrax manufactured by IKA Inc., and further dispersed for 10 minutes using an ultrasonic bath, thereby obtaining a colorant particle dispersion liquid 1 having a solid content of 21%. The volume average particle diameter thereof is measured with a particle diameter measuring device LA-700 manufactured by HORIBA, Ltd. and is found to be 160 nm.

—Preparation of Mold Releasing Agent Particle Dispersion Liquid 1—

Paraffin wax (HNP-9 (manufactured by Nippon Seiro Co., Ltd.): 19 parts by mass

Anionic surfactant (Neogen SC (manufactured by DKS Co. Ltd.): 1 part by mass

Ion-exchanged water: 80 parts by mass

The above materials are mixed in a heat-resistant container, heated to a temperature of 90° C., and stirred for 30 minutes. Next, a melt solution is flowed from a bottom of the container to a Gaulin homogenizer, subjected to a circulation operation corresponding to three paths under a pressure condition of 5 MPa, and further subjected to a circulation operation corresponding to three paths while increasing the pressure to 35 MPa. An emulsified solution thus prepared is cooled to 40° C. or lower in the heat-resistant container, thereby obtaining a mold releasing agent particle dispersion liquid 1. The volume average particle diameter thereof is measured with the particle size measuring device LA-700 manufactured by HORIBA, Ltd. and is found to be 240 nm.

—Resin Particle Dispersion Liquid 1—

[Oil Layer]

Styrene (manufactured by Fujifilm Wako Pure Chemical Industries, Ltd.): 30 parts by mass n-butyl acrylate (manufactured by Fujifilm Wako Pure Chemical Industries, Ltd.): 10 parts by mass β-carboxyethyl acrylate (manufactured by Rhodia NYCCA Co., Ltd.): 1.3 parts by mass Dodecane thiol (manufactured by Fujifilm Wako Pure Chemical Industries, Ltd.): 0.4 parts by mass

[Aqueous Layer 1]

Ion-exchanged water: 17 parts by mass

Anionic surfactant (Dow Fax manufactured by Dow Chemical Co., Ltd.): 0.4 parts by mass

[Aqueous Layer 2]

Ion-exchanged water: 40 parts by mass

Anionic surfactant (Dow Fax manufactured by Dow Chemical Co., Ltd.): 0.05 parts by mass Ammonium peroxodisulfate (manufactured by Fujifilm Wako Pure Chemical Industries, Ltd.): 0.4 parts by mass The component of the above oil layer and the above component of the aqueous layer 1 are charged into a flask and mixed by stirring to obtain a monomeric emulsion dispersion liquid. The component of the aqueous layer 2 is put in a reaction vessel, an inside of the vessel is sufficiently replaced with nitrogen, and the inside of the reaction system is heated to 75° C. with an oil bath while stirring. The above monomeric emulsion dispersion liquid is gradually added dropwise into the reaction vessel over 3 hours to carry out emulsion polymerization. After completing of the dropping, the polymerization is further continued at 75° C., and the polymerization is completed after 3 hours.

For the obtained resin particles, the volume average particle diameter D50v of the resin particles is measured with the laser diffraction type particle size distribution measuring device LA-700 (manufactured by HORIBA, Ltd.) and is found to be 250 nm, the glass transition point of the resin is measured at a heating rate of 10° C./min using a differential scanning calorimeter (DSC-50, manufactured by Shimadzu Corporation) and is found to be 53° C., and the number average molecular weight (in terms of polystyrene) is measured using THF as a solvent with a molecular weight measuring instrument (HLC-8020, manufactured by Tosoh Corporation) and is found to be 13,000. As a result, a resin particle dispersion liquid having a volume average particle diameter of 250 nm, a solid content of 42%, a glass transition point of 53° C., and a number average molecular weight Mn of 13,000 is obtained.

—Preparation of Toner 1—

Resin particle dispersion liquid: 150 parts by mass

Colorant particle dispersion liquid: 30 parts by mass

Mold releasing agent particle dispersion liquid: 40 parts by mass

Polyaluminum chloride: 0.4 parts by mass

The above components are sufficiently mixed and dispersed in a stainless steel flask using the Ultra-Turrax manufactured by IKA, Inc., and then heated to 48° C. while stirring the flask in a heating oil bath. After holding at 48° C. for 80 minutes, 70 parts by mass of the same resin particle dispersion liquid as above is slowly added thereto.

Then, the pH in the system is adjusted to 6.0 using an aqueous sodium hydroxide solution having a concentration of 0.5 mol/L, and then the stainless steel flask is sealed. Sealing of a stirring shaft is magnetically performed, and the flask is heated to 97° C. and held for 3 hours while continuing stirring. After completion of the reaction, the temperature is lowered at a rate of 1° C./min, and the obtained product is filtered and sufficiently washed with ion-exchanged water, and then subjected to solid-liquid separation by Nucci-type suction filtration. The obtained product is further redispersed using 3,000 parts by mass of ion-exchanged water at 40° C., and stirred and washed at 300 rpm for 15 minutes. This washing operation is repeated of further 5 times, and when the pH of the filtrate is 6.54 and the electrical conductivity is 6.5 μS/cm, the solid-liquid separation is performed using No. 5A filter paper. Then, vacuum drying is continuously performed for 12 hours to obtain toner mother particles.

The volume average particle diameter D50v of the toner mother particles is measured with a Coulter counter and found to be 6.2 μm, and a volume average particle size distribution index GSDv is 1.20. When shape observation is performed with a Luzex image analyzer manufactured by Luzex, the particle shape coefficient SF1 is 135, and the particles are observed to have a potato shape. The glass transition point of the toner is 52° C. Then, silica ($SiO_2$) particles having an average primary particle diameter of 40 nm whose surface has been subjected to a hydrophobic treatment with hexamethyldisilazane (hereinafter may be abbreviated as "HMDS") and metatitanic acid compound particles having an average primary particle diameter of 20 nm, which is a reaction product of metatitanic acid and isobutyltrimethoxysilane are added to the toner such that a coverage to the surface of the toner particles is 40%, and the above substances are mixed with a Henschel mixer to prepare a toner 1.

<Preparation of Magnetic Particle 1>

1318 parts by mass of $Fe_2O_3$, 586 parts by mass of $Mn(OH)_2$, 96 parts by mass of $Mg(OH)_2$, and 13 parts by mass of $CaCO_3$ are mixed, and then a dispersant, water, and zirconia beads having a median diameter of 1 mm are added thereto, and the mixture is crushed and mixed with a sand mill. The zirconia beads are filtered and dried, and then a mixed oxide is prepared in a rotary kiln at 20 rpm and 900° C. Next, a dispersant and water are added, 6.6 parts by mass of polyvinyl alcohol is further added, and pulverization is performed with a wet ball mill until the volume average particle diameter is 1.2 μm. Next, the particles are granulated and dried with a spray dryer such that a dried particle diameter is 32 μm. Further, firing is carried out in an electric furnace at a temperature of 1220° C. and an oxygen concentration of 1% in an oxygen-nitrogen mixed atmosphere for 5 hours. The obtained particles are subjected to a crushing step and a classification step, and then heated in the rotary kiln at 15 rpm and 900° C. for 2 hours, and similarly, a classification step is performed, thereby obtaining magnetic particle 1. In the magnetic particle 1, the volume average particle diameter is 30 μm, and the BET specific surface area is 0.20 $m^2/g$.

<Preparation of Magnetic Particles 2 to 14>

Magnetic particles 2 to 14 are prepared in the same manner as the magnetic particle 1 except that compositions and reaction conditions are changed to those in Table 1.

TABLE 1

| | D50 (μm) | Fluidity (s/50 g) | BET specific surface area ($m^2/g$) | Raw material composition $Fe_2O_3$ (part by mass) | $Mn(OH)_2$ (part by | $Mg(OH)_2$ (part by mass) | $SiO_2$ (part by mass) | $CaCO_3$ (part by mass) |
|---|---|---|---|---|---|---|---|---|
| Magnetic particle 1 | 30 | 32 | 0.20 | 1318 | 586 | 96 | 0 | 13 |
| Magnetic particle 2 | 25 | 34 | 0.22 | 1318 | 586 | 96 | 0.1 | 13 |
| Magnetic particle 3 | 34 | 30 | 0.16 | 1318 | 586 | 96 | 0.1 | 13 |
| Magnetic particle 4 | 30 | 28 | 0.16 | 1318 | 586 | 96 | 0 | 13 |
| Magnetic particle 5 | 30 | 36 | 0.26 | 1318 | 586 | 96 | 0.1 | 13 |
| Magnetic particle 6 | 30 | 30 | 0.14 | 1318 | 586 | 96 | 0 | 13 |
| Magnetic particle 7 | 28 | 33 | 0.28 | 1318 | 586 | 96 | 0.12 | 13 |
| Magnetic particle 8 | 24 | 33 | 0.20 | 1318 | 586 | 96 | 0.1 | 26 |
| Magnetic particle 9 | 30 | 32 | 0.20 | 1318 | 586 | 96 | 0.1 | 33 |
| Magnetic particle 10 | 30 | 32 | 0.20 | 1318 | 586 | 96 | 0.1 | 0 |
| Magnetic particle 11 | 30 | 32 | 0.20 | 1318 | 586 | 96 | 0 | $SrCO_3$/8.7 |
| Magnetic particle 12 | 36 | 31 | 0.16 | 1318 | 586 | 96 | 0.15 | 13 |
| Magnetic particle 13 | 30 | 26 | 0.18 | 1318 | 586 | 96 | 0 | 13 |
| Magnetic particle 14 | 30 | 37 | 0.20 | 1318 | 586 | 96 | 0.16 | 13 |
| Magnetic particle 15 | 30 | 33 | 0.12 | 1318 | 586 | 96 | 0 | 0.7 |
| Magnetic particle 16 | 30 | 29 | 0.30 | 1318 | 586 | 96 | 0.2 | 13 |

| | Temporary firing Temperature (° C.) | Slurry pulverization Crushed particle diameter (μm) | Granulation Dried particle diameter (μm) | Main firing Temperature (° C.) | Main firing $O_2$ (%) | Additional process Temperature (° C.) | In ferrite Ca ratio |
|---|---|---|---|---|---|---|---|
| Magnetic particle 1 | 900 | 1.2 | 32 | 1220 | 1.0 | 900 | 1 |
| Magnetic particle 2 | 900 | 1.0 | 26 | 1200 | 1.2 | 900 | 1 |
| Magnetic particle 3 | 900 | 1.3 | 36 | 1240 | 1.0 | 900 | 1 |
| Magnetic particle 4 | 900 | 1.2 | 32 | 1200 | 1.0 | 900 | 1 |
| Magnetic particle 5 | 900 | 1.2 | 32 | 1220 | 1.4 | 900 | 1 |
| Magnetic particle 6 | 900 | 1.3 | 32 | 1240 | 0.9 | 900 | 1 |
| Magnetic particle 7 | 900 | 1.2 | 32 | 1200 | 1.3 | 900 | 1 |
| Magnetic particle 8 | 900 | 1.0 | 22 | 1210 | 1.2 | 900 | 2 |
| Magnetic particle 9 | 900 | 1.2 | 32 | 1230 | 1.0 | 900 | 2.5 |
| Magnetic particle 10 | 900 | 1.0 | 32 | 1200 | 1.3 | 900 | 0 |
| Magnetic particle 11 | 900 | 1.2 | 32 | 1220 | 1.0 | 900 | Sr ratio/1 |
| Magnetic particle 12 | 900 | 1.4 | 38 | 1200 | 1.1 | 900 | 1 |
| Magnetic particle 13 | 900 | 1.2 | 32 | 1230 | 1.2 | 900 | 1 |
| Magnetic particle 14 | 900 | 1.4 | 37 | 1210 | 1.3 | 900 | 1 |
| Magnetic particle 15 | 900 | 1.0 | 33 | 1240 | 1.0 | 900 | 0.05 |
| Magnetic particle 16 | 900 | 1.0 | 32 | 1210 | 1.5 | 900 | 1 |

<Silica Particles and Calcium Carbonate Particles Added to Resin Coating Layer of Carrier>

Silica particles: commercially available hydrophobic silica particles having an arithmetic average particle diameter of 12 nm, 90 nm, 30 nm, or 45 nm are used.

Calcium carbonate particles: commercially available calcium carbonate particles

<Preparation of Coating Agent for Forming Resin Coating Layer of Carrier>

[Preparation of Coating Agent]

Polycyclohexyl methacrylate (weight average molecular weight shown in Table 2): 30 parts Carbon black (VXC72 manufactured by Cabot Corporation): 0.5 parts Inorganic particles shown in Table 2: amount shown in Table 2

Toluene: 250 parts

Isopropyl alcohol: 50 parts

The above materials and glass beads (diameter: 1 mm, the same amount as toluene) are charged into a sand mill and stirred at a rotation speed of 190 rpm for 30 minutes, to obtain a coating agent (1) having a solid content of 11%.

Examples 1 to 22 and Comparative Examples 1 to 6

<Preparation of Resin-Coated Carrier>

—Preparation of Carrier 1—

1,000 parts of the magnetic particle and 570 parts of the coating agent are charged into a kneader and mixed at room temperature (25° C.) for 20 minutes. Then, the mixture is heated to 70° C., reduced in pressure and dried.

Next, a dried product is taken out from the kneader, and coarse powder is sieved with a mesh having a mesh size of 75 μm and removed. Then, a carrier 1 is obtained.

—Preparation of Carriers 2 to 28—

Carriers 2 to 28 are obtained in the same manner as the preparation of the carrier 1 except that the magnetic particle, the inorganic particles and the addition amounts thereof, Mw of polycyclohexyl methacrylate, and the addition amount of the coating agent are changed to those shown in Table 2.

<Preparation of Developer>

Any one of the carriers 1 to 28 and the toner 1 are put in a V blender at a mixing ratio of carrier:toner=100:10 (mass ratio) and stirred for 20 minutes to obtain developers 1 to 28.

<Measurement of Average Particle Diameter of Silica Particles in Resin Coating Layer>

The carrier is embedded in an epoxy resin and cut with a microtome to prepare a carrier cross section. The SEM image obtained by photographing the carrier cross section with a scanning transmission electron microscope (made by Hitachi, Ltd., S-4100) is taken into an image processing analyzer (made by Nireco Corporation, Luzex AP) and then image analysis is performed. 100 silica particles (primary particles) in the resin coating layer are randomly selected, and an equivalent circular diameter (nm) of each particle is calculated and arithmetically averaged to obtain the average particle diameter (nm) of the silica particles.

<Measurement of Average Thickness of Resin Coating Layer>

The SEM image obtained above is taken into the image processing analyzer (Luzex AP, manufactured by Nireco Corporation) and then image analysis is performed. The thickness (μm) of the resin coating layer is measured by randomly selecting 10 points per one particle of the carrier, and 100 particles of the carrier are further selected to measure thicknesses thereof, and all the thicknesses are arithmetically averaged to obtain the average thickness (μm) of the resin coating layer.

<Surface Analysis of Carrier>

As an apparatus for three-dimensionally analyzing the surface of the carrier, an electron beam three-dimensional roughness analyzer ERA-8900FE manufactured by Elionix Inc. is used. The surface analysis of the carrier by ERA-8900FE is specifically performed as follows.

The surface of one carrier particle is magnified 5,000 times, 400 points are taken in a long side direction and 300 points are taken in a short side direction, and three-dimensional measurement is performed. Three-dimensional image data is obtained for a region of 24 μm×18 μm. For the three-dimensional image data, the limit wavelength of the spline filter is set to 12 μm to remove wavelengths having a period of 12 μm or more, and the cutoff value of the Gaussian high-pass filter is set to 2.0 μm to remove wavelengths having a period of 2.0 μm or more, so as to obtain three-dimensional roughness curve data. From three-dimensional roughness curve data, the surface area B ($\mu m^2$) of a central portion 12 μm×12 μm region (the plan view area A=144 $\mu m^2$) is obtained, so as to obtain the ratio B/A. The ratio B/A is calculated for each of 100 carriers and the arithmetic average value is obtained.

<Measurement of Silicon Element Concentration>

The carrier is used as a sample and analyzed by X-ray photoelectron spectroscopy (XPS) under the following conditions, and the silicon element concentration (atomic %) is obtained from a peak intensity of each element.

XPS device: Versa Probe II manufactured by ULVAC-PHI, Inc.

Etching gun: argon gun

Acceleration voltage: 5 kV

Emission current: 20 mA

Spatter area: 2 mm×2 mm

Sputter rate: 3 nm/min (in terms of $SiO_2$)

<Collection of Magnetic Particles from Developer>

The carrier is separated from the developer with a 16 μm mesh. The coating layer of the separated carrier is dissolved by, for example, toluene, and the magnetic particles are taken out. The solvent can be freely changed according to the coating resin. As for differences in dissolution, heating, ultrasonic wave application, and the like are used according to the solvent.

<Volume Average Particle Diameter of Magnetic Particle>

The volume average particle diameter of the magnetic particle is measured by the laser diffraction particle size distribution measuring device LA-700 (manufactured by HORIBA, Ltd.).

<Fluidity of Magnetic Particle>

The fluidity of the magnetic particle is measured according to MS Z2502 (2020) under 25° C. and 50% RH.

<Measurement of BET Specific Surface Area of Magnetic Particle>

20 g of the resin-coated carrier is added into 100 mL of toluene. Ultrasonic waves are applied for 30 seconds under a condition of 40 kHz. The magnetic particles are separated from the resin solution using any filter paper according to the particle diameter. 20 mL of toluene is poured over the magnetic particles remaining on the filter paper to wash the magnetic particles. Next, the magnetic particles remaining on the filter paper are recovered. Similarly, the recovered magnetic particles are added in 100 mL of toluene and the ultrasonic waves are applied for 30 seconds under the condition of 40 kHz. Similarly, the magnetic particles are filtered, washed with 20 mL of toluene, and then recovered. The above process is performed for a total of 10 times. The finally recovered magnetic particles are dried, and the BET specific surface area is measured under the above conditions.

<Density Change Inhibitory Property (23° C. and 55% RH): When High-Density Printing is Performed after Continuous Printing with Small Amount of Image>

C400 modified machine, which is Docu Centre manufactured by Fuji Xerox Co., Ltd. and adjusted to operate only Cyan, prints 100 characters of 12 pt on each of 1,000 sheets of A4 size under an environment of 23° C. and 55% RH. Then, 100 sheets of 15 cm square solid images are printed. Densities of the 1st solid image and the 100th solid image are compared using X-Rite manufactured by X-Rite Inc., and a difference in density is determined. The smaller the difference in density is, the better the density change inhibitory property is.

<Density Change Inhibitory Property (28° C. and 85% RH)>

Evaluation is carried out in the same manner as the evaluation of the density change inhibitory property (23° C. and 55% RH) except that the evaluation is performed under an environment of 28° C. and 85% RH.

Example 23

<Preparation of Amorphous Resin A>

61 parts by mass of dimethyl terephthalate, 75 parts by mass of dimethyl fumarate, 34 parts by mass of dodecenyl succinate anhydride, 16 parts by mass of trimellitic acid, 137 parts by mass of bisphenol A ethylene oxide adduct, and 191 parts by mass of bisphenol A propylene oxide adduct, and 0.3 parts by mass of dibutyl tin oxide are reacted at 180° C. for 3 hours in a three-necked flask under a nitrogen atmosphere while removing water produced by the reaction from the system, then the temperature is raised to 240° C. while gradually reducing the pressure, and the mixture is reacted for 2 hours and then cooled. In this way, an amorphous resin A having a weight average molecular weight of 17,100 is prepared.

<Preparation of Crystalline Resin A>

100 parts by mass of dimethyl sebacate, 67.8 parts by mass of hexanediol, and 0.10 parts by mass of dibutyl tin oxide are reacted at 185° C. for 5 hours in a three-necked flask under a nitrogen atmosphere while removing water produced by the reaction from the system, then the temperature is raised to 220° C. while gradually reducing the pressure, and the mixture is reacted for 6 hours and then cooled. In this way, a crystalline resin A having a weight average molecular weight of 33,700 is prepared.

The melting temperature of this crystalline resin A is determined based on the "melting peak temperature" described in a method for determining the melting temperature of HS K7121-1987 "Method for determining transition temperature of plastics" from a DSC curve obtained by the differential scanning calorimetry (DSC), and is found to be 71° C.

<Preparation of Toner 2>

79 parts by mass of the amorphous resin A, 7 parts by mass of a colorant (C.I. Pigment Blue 15:1), 5 parts by mass of a mold releasing agent (paraffin wax having a melting temperature of 73° C., manufactured by Nippon Seiro Co., Ltd.), and 8 parts by mass of the crystalline resin A (melting temperature: 71° C.) are charged into a Henschel mixer (manufactured by Nippon Coke Industries, Ltd.), stirred and mixed at a peripheral speed of 15 m/s for 5 minutes, and then the obtained stirring mixture is melt-kneaded with an extruder type continuous kneader.

Here, setting conditions of the extruder include a supply side temperature of 160° C., a discharge side temperature of 130° C., a cooling roller supply side temperature of 40° C., and a discharge side temperature of 25° C. A cooling belt temperature is set to 10° C.

The obtained melt-kneaded product is cooled, roughly pulverized using a hammer mill, then finely pulverized to 6.5 μm using a jet crusher (manufactured by Nippon Pneumatic Industries Co., Ltd.), and further classified using an elbow jet classifier (Model: EJ-LABO, manufactured by Nittetsu Mining Co., Ltd.) to obtain toner particles 2.

In the toner particles 2, the volume average particle diameter is 6.9 μm, and SF1 is 145.

Further, 100 parts by mass of the toner particles 2 and 1.2 parts by mass of commercially available fumed silica RX50 (manufactured by Nippon Aerosil Co., Ltd.) as the external additive are mixed using a Henschel mixer (manufactured by Mitsui Miike Machinery Co., Ltd.) at a peripheral speed of 30 m/s for 5 minutes to obtain a toner 2.

<Preparation of Developer>

The carrier 1 and the toner 2 are put in a V blender at a mixing ratio of carrier:toner=100:10 (mass ratio) and stirred for 20 minutes to obtain a developer 30 of Example 23.

Evaluation is carried out in the same manner as in Example 1 using the developer 30.

Example 24

A carrier 29 is prepared in the same manner as in Example 1 except that a methyl methacrylate-dimethylaminoethyl methacrylate (mass ratio: 99.5:0.5) copolymer (Mw: 50,000) is used instead of polycyclohexyl methacrylate.

A developer 29 is prepared in the same manner as in Example 1 using the carrier 29. Evaluation is carried out in the same manner as in Example 1 using the developer 29.

TABLE 2

| | | | Magnetic particle | | | | | | | Inorganic particles Arithmetic |
|---|---|---|---|---|---|---|---|---|---|---|
| | Kind of Carrier | B/A | kind | Fluidity (s/50 g) | Volume average particle diameter (μm) | Sr amount (mass %) | Ca amount (mass %) | BET specific surface area | | average particle diameter (nm) |
| Example 1 | 1 | 1.050 | 1 | 32 | 30 | — | 1 | 0.2 | | 40 |
| Example 2 | 2 | 1.020 | 1 | 32 | 30 | — | 1 | 0.2 | | 40 |
| Example 3 | 3 | 1.100 | 1 | 32 | 30 | — | 1 | 0.2 | | 40 |
| Example 4 | 4 | 1.050 | 2 | 34 | 25 | — | 1 | 0.22 | | 40 |
| Example 5 | 5 | 1.050 | 3 | 30 | 34 | — | 1 | 0.16 | | 40 |
| Example 6 | 6 | 1.050 | 4 | 28 | 30 | — | 1 | 0.16 | | 40 |
| Example 7 | 7 | 1.050 | 5 | 33 | 30 | — | 1 | 0.26 | | 40 |
| Example 8 | 8 | 1.050 | 6 | 30 | 30 | — | 1 | 0.14 | | 40 |

TABLE 2-continued

| | | | | | | | | | |
|---|---|---|---|---|---|---|---|---|---|
| Example 9 | 9 | 1.050 | 7 | 33 | 28 | — | 1 | 0.28 | 40 |
| Comparative Example 1 | 10 | 1.050 | 8 | 33 | 24 | — | 2 | 0.2 | 40 |
| Example 10 | 11 | 1.050 | 9 | 32 | 30 | — | 2.5 | 0.2 | 40 |
| Example 11 | 12 | 1.050 | 10 | 32 | 30 | — | — | 0.2 | 40 |
| Example 12 | 13 | 1.050 | 11 | 32 | 30 | 1 | — | 0.2 | 40 |
| Comparative Example 2 | 14 | 1.050 | 12 | 31 | 36 | — | 1 | 0.16 | 40 |
| Comparative Example 3 | 15 | 1.050 | 13 | 26 | 30 | — | 1 | 0.18 | 40 |
| Comparative Example 4 | 16 | 1.050 | 14 | 37 | 30 | — | 1 | 0.2 | 40 |
| Example 13 | 17 | 1.050 | 15 | 33 | 30 | — | 1 | 0.12 | 40 |
| Example 14 | 18 | 1.050 | 16 | 29 | 30 | — | 1 | 0.3 | 40 |
| Example 15 | 19 | 1.030 | 1 | 32 | 30 | — | 1 | 0.18 | 12 |
| Example 16 | 20 | 1.100 | 1 | 32 | 30 | — | 1 | 0.18 | 90 |
| Example 17 | 21 | 1.050 | 6 | 30 | 30 | — | 1 | 0.18 | 40 |
| Example 18 | 22 | 1.080 | 6 | 30 | 30 | — | 1 | 0.26 | 40 |
| Example 19 | 23 | 1.080 | 5 | 33 | 30 | — | 1 | 0.26 | 40 |
| Example 20 | 24 | 1.050 | 6 | 30 | 30 | — | 1 | 0.18 | 40 |
| Example 21 | 25 | 1.050 | 1 | 32 | 30 | — | 1 | 0.18 | 40 |
| Example 22 | 26 | 1.050 | 1 | 32 | 30 | — | 1 | 0.18 | 40 |
| Comparative Example 5 | 27 | 0.900 | 1 | 32 | 30 | — | 1 | 0.18 | 30 |
| Comparative Example 6 | 28 | 1.150 | 1 | 32 | 30 | — | 1 | 0.18 | 45 |

| | Inorganic particles | | | Average | Coating agent | | |
|---|---|---|---|---|---|---|---|
| | Content (mass %) of silica particles | Content (mass %) of $CaCO_3$ particles | Silicon element concentration (atomic %) on surface | thickness (µm) of resin coating layer | Addition amount (part by mass) of inorganic particles | Mw of polycyclohexyl methacrylate | Addition amount (part by mass) of coating agent |
| Example 1 | 40 | — | 10 | 1.2 | 20 | 50, 000 | 570 |
| Example 2 | 37 | — | 9 | 1.2 | 18 | 50, 000 | 570 |
| Example 3 | 50 | — | 12 | 1.1 | 30 | 50, 000 | 510 |
| Example 4 | 40 | — | 10 | 1.2 | 20 | 50, 000 | 570 |
| Example 5 | 40 | — | 10 | 1.2 | 20 | 50, 000 | 570 |
| Example 6 | 40 | — | 10 | 1.2 | 20 | 50, 000 | 570 |
| Example 7 | 40 | — | 11 | 0.8 | 20 | 50, 000 | 570 |
| Example 8 | 40 | — | 10 | 1.3 | 20 | 50, 000 | 570 |
| Example 9 | 40 | — | 10 | 0.8 | 20 | 50, 000 | 570 |
| Comparative Example 1 | 40 | — | 10 | 1.2 | 20 | 50, 000 | 570 |
| Example 10 | 40 | — | 10 | 1.2 | 30 | 50, 000 | 570 |
| Example 11 | 40 | — | — | 1.3 | 20 | 50, 000 | 570 |
| Example 12 | 40 | — | 12 | 0.8 | 20 | 50, 000 | 570 |
| Comparative Example 2 | 40 | — | 10 | 1.2 | 20 | 50, 000 | 570 |
| Comparative Example 3 | 40 | — | 10 | 1.1 | 20 | 50, 000 | 570 |
| Comparative Example 4 | 40 | — | 10 | 1.2 | 20 | 50, 000 | 570 |
| Example 13 | 40 | — | 10 | 1.2 | 20 | 50, 000 | 570 |
| Example 14 | 40 | — | 11 | 1.1 | 20 | 50, 000 | 570 |
| Example 15 | 45 | — | 10 | 1.0 | 25 | 50, 000 | 550 |
| Example 16 | 15 | — | 10 | 0.9 | 5.5 | 50, 000 | 520 |
| Example 17 | 15 | — | 2 | 1.2 | 5.5 | 50, 000 | 570 |
| Example 18 | 37 | — | 22 | 1.2 | 18 | 50, 000 | 570 |
| Example 19 | 20 | — | 10 | 0.5 | 20 | 50, 000 | 490 |
| Example 20 | 40 | — | 10 | 1.6 | 20 | 50, 000 | 610 |
| Example 21 | 40 | — | 10 | 1.2 | 20 | 250, 000 | 570 |
| Example 22 | 40 | — | 10 | 1.2 | 20 | 450, 000 | 570 |
| Comparative Example 5 | 33 | — | 9 | 1.2 | 15 | 50, 000 | 590 |
| Comparative Example 6 | 46 | — | 12 | 1.2 | 26 | 50, 000 | 550 |

TABLE 3

| | kind of Carrier | Arithmetic average particle diameter (nm) of inorganic particles | Average thickness (μm) of resin coating layer | B/A | Density change inhibitory property (23° C. 55% RH) | Density change inhibitory property (28° C. 85% RH) |
|---|---|---|---|---|---|---|
| Example 1 | Carrier 1 | 40 | 1.2 | 1.050 | 0.05 | 0.10 |
| Example 2 | Carrier 2 | 40 | 1.2 | 1.020 | 0.18 | — |
| Example 3 | Carrier 3 | 40 | 1.1 | 1.100 | 0.16 | — |
| Example 4 | Carrier 4 | 40 | 1.2 | 1.050 | 0.10 | — |
| Example 5 | Carrier 5 | 40 | 1.2 | 1.050 | 0.12 | — |
| Example 6 | Carrier 6 | 40 | 1.2 | 1.050 | 0.09 | — |
| Example 7 | Carrier 7 | 40 | 0.8 | 1.050 | 0.14 | — |
| Example 8 | Carrier 8 | 40 | 1.3 | 1.050 | 0.10 | — |
| Example 9 | Carrier 9 | 40 | 0.8 | 1.050 | 0.14 | — |
| Example 10 | Carrier 11 | 40 | 1.2 | 1.050 | 0.14 | 0.20 |
| Example 11 | Carrier 12 | 40 | 1.3 | 1.050 | 0.15 | 0.24 |
| Example 12 | Carrier 13 | 40 | 0.8 | 1.050 | 0.16 | 0.24 |
| Example 13 | Carrier 17 | 40 | 1.2 | 1.050 | 0.17 | — |
| Example 14 | Carrier 18 | 40 | 1.1 | 1.050 | 0.18 | — |
| Example 15 | Carrier 19 | 12 | 1.0 | 1.030 | 0.16 | — |
| Example 16 | Carrier 20 | 90 | 0.9 | 1.100 | 0.15 | — |
| Example 17 | Carrier 21 | 40 | 1.2 | 1.050 | 0.20 | — |
| Example 18 | Carrier 22 | 40 | 1.2 | 1.080 | 0.16 | — |
| Example 19 | Carrier 23 | 40 | 0.5 | 1.080 | 0.20 | — |
| Example 20 | Carrier 24 | 40 | 1.6 | 1.050 | 0.12 | — |
| Example 21 | Carrier 25 | 40 | 1.2 | 1.050 | 0.10 | — |
| Example 22 | Carrier 26 | 40 | 1.2 | 1.050 | 0.12 | — |
| Comparative Example 1 | Carrier 10 | 40 | 1.2 | 1.050 | 0.25 | — |
| Comparative Example 2 | Carrier 14 | 40 | 1.2 | 1.050 | 0.24 | — |
| Comparative Example 3 | Carrier 15 | 40 | 1.1 | 1.050 | 0.26 | — |
| Comparative Example 4 | Carrier 16 | 40 | 1.2 | 1.050 | 0.23 | — |
| Comparative Example 5 | Carrier 27 | 30 | 1.2 | 0.900 | 0.30 | — |
| Comparative Example 6 | Carrier 28 | 45 | 1.2 | 1.150 | 0.28 | — |
| Example 23 | Carrier 1 | 40 | 1.2 | 1.050 | 0.04 | 0.08 |
| Example 24 | Carrier 29 | 50 | 1.2 | 1.060 | 0.15 | — |

The content (mass %) of the silica particles and the content (mass %) of the $CaCO_3$ particles in the inorganic particles column shown in Table 2 represent a content with respect to the total mass of the resin coating layer.

From the above results, it can be seen that the present Examples are superior than Comparative Examples in the density change inhibitory property even when high density printing is performed after continuous printing with a small amount of images.

It can be seen that the electrostatic charge image developing carrier in Example 23 is more excellent than the electrostatic charge image developing carrier of Example 1 in the density change inhibitory property even when high-density printing under high-temperature and high-humidity is performed after continuous printing with a small amount of images in a high-temperature and high-humidity environment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing carrier, comprising:

a magnetic particle; and a resin coating layer coating the magnetic particle, wherein the resin coating layer contains inorganic particles, a ratio B/A of a surface area B of the carrier to a plan view area A of the carrier that are obtained by three-dimensional analysis of a surface of the carrier is 1.020 or more and 1.100 or less, a volume average particle diameter of the magnetic particle is 25 μm or more and 34 μm or less, and a fluidity of the magnetic particle is 28 s/50 g or more and 36 s/50 g or less.

2. The electrostatic charge image developing carrier according to claim 1, wherein an arithmetic average particle diameter of the inorganic particles is 5 nm or more and 90 nm or less.

3. The electrostatic charge image developing carrier according to claim 1, wherein an average thickness of the resin coating layer is 0.6 μm or more and 1.4 μm or less.

4. The electrostatic charge image developing carrier according to claim 2, wherein an average thickness of the resin coating layer is 0.6 μm or more and 1.4 μm or less.

5. The electrostatic charge image developing carrier according to claim 1, wherein the magnetic particle contains calcium element.

6. The electrostatic charge image developing carrier according to claim 5, wherein a content of the calcium element in the magnetic particle is 0.1 mass % or more and less than 2.0 mass %.

7. The electrostatic charge image developing carrier according to claim 1, wherein a value of a BET specific surface area of the magnetic particle is 0.14 $m^2/g$ or more and 0.28 $m^2/g$ or less.

8. The electrostatic charge image developing carrier according to claim 1, wherein the resin coating layer contains an acrylic resin.

9. The electrostatic charge image developing carrier according to claim 1, wherein the inorganic particles include silica particles.

10. The electrostatic charge image developing carrier according to claim 9, wherein a silicon element concentration at the surface of the carrier determined by X-ray photoelectron spectroscopy is more than 2 atomic % and less than 20 atomic %.

11. The electrostatic charge image developing carrier according to claim 10, wherein the silicon element concentration at the surface of the carrier is more than 5 atomic % and less than 20 atomic %.

12. The electrostatic charge image developing carrier according to claim 1, wherein a content of the inorganic particles is 10 mass % or more and 60 mass % or less with respect to the resin coating layer.

13. The electrostatic charge image developing carrier according to claim 1, wherein a weight average molecular weight of a resin contained in the resin coating layer is less than 300,000.

14. The electrostatic charge image developing carrier according to claim 13, wherein the weight average molecular weight of the resin contained in the resin coating layer is less than 250,000.

15. An electrostatic charge image developer, comprising:

an electrostatic charge image developing toner; and the electrostatic charge image developing carrier according to claim 1.

16. A process cartridge configured to be attached to and detached from an image forming apparatus, the process cartridge comprising:

a developing unit that accommodates the electrostatic charge image developer according to claim 15, and is configured to develop an electrostatic charge image as a toner image by the electrostatic charge image developer, the electrostatic charge image being formed on a surface of an image carrier.

17. An image forming apparatus, comprising:

an image carrier;

a charging unit configured to charge a surface of the image carrier;

an electrostatic charge image forming unit configured to form an electrostatic charge image on the surface of the image carrier charged;

a developing unit that accommodates the electrostatic charge image developer according to claim 15, and is configured to develop an electrostatic charge image as a toner image by the electrostatic charge image developer, the electrostatic charge image being formed on the surface of the image carrier;

a transfer unit configured to transfer the toner image formed on the surface of the image carrier to a surface of a recording medium; and a fixing unit configured to fix the toner image transferred to the surface of the recording medium.

18. An image forming method, comprising:

charging a surface of an image carrier;

forming an electrostatic charge image on the surface of the image carrier charged;

developing an electrostatic charge image as a toner image by the electrostatic charge image developer according to claim 15, the electrostatic charge image being formed on the surface of the image carrier;

transferring the toner image formed on the surface of the image carrier to a surface of a recording medium; and fixing the toner image transferred to the surface of the recording medium.

* * * * *